(12) United States Patent
Rupp et al.

(10) Patent No.: US 12,016,257 B2
(45) Date of Patent: Jun. 25, 2024

(54) METHODS FOR DETECTING AND CLEARING DEBRIS FROM PLANTER GAUGE WHEELS, CLOSING WHEELS AND SEED TUBES

(71) Applicant: Sabanto, Inc., Chicago, IL (US)

(72) Inventors: Craig Rupp, Ames, IA (US); Corwin Spaetti, Winthrop Harbor, IL (US); Aaron Petersdorf, Hampshire, IL (US); Adam Gaynor, Chicago, IL (US)

(73) Assignee: Sabanto, Inc., Chicago, IL (US)

( * ) Notice: Subject to any disclaimer, the term of this patent is extended or adjusted under 35 U.S.C. 154(b) by 766 days.

(21) Appl. No.: 17/177,192

(22) Filed: Feb. 16, 2021

(65) Prior Publication Data

US 2021/0251128 A1    Aug. 19, 2021

Related U.S. Application Data

(60) Provisional application No. 62/978,558, filed on Feb. 19, 2020.

(51) Int. Cl.
| | |
|---|---|
| *A01B 79/02* | (2006.01) |
| *A01B 27/00* | (2006.01) |
| *A01C 5/06* | (2006.01) |
| *A01C 7/20* | (2006.01) |
| *G05B 15/02* | (2006.01) |
| *G06T 7/00* | (2017.01) |
| *G06T 7/90* | (2017.01) |
| *G08B 21/18* | (2006.01) |

(52) U.S. Cl.
CPC ............ *A01B 79/02* (2013.01); *A01B 27/005* (2013.01); *A01C 5/064* (2013.01); *A01C 5/068* (2013.01); *A01C 7/208* (2013.01); *G05B 15/02* (2013.01); *G06T 7/0002* (2013.01); *G06T 7/90* (2017.01); *G08B 21/182* (2013.01); *G06T 2207/10024* (2013.01); *G06T 2207/30204* (2013.01)

(58) Field of Classification Search
CPC ....... A01B 79/02; A01B 27/005; A01C 5/064; A01C 5/068; A01C 7/208; G05B 15/02; G06T 7/0002; G06T 2207/10024; G06T 2207/30204; G08T 21/182
See application file for complete search history.

(56) References Cited

U.S. PATENT DOCUMENTS

| | | | |
|---|---|---|---|
| 4,365,268 A | 12/1982 | Allen et al. |
| 4,401,403 A | 8/1983 | Johnson et al. |
| 4,463,811 A | 8/1984 | Winter |
| 4,489,321 A | 12/1984 | Hoffa et al. |
| 4,505,094 A | 3/1985 | Demorest |
| 4,518,044 A | 5/1985 | Wiegardt et al. |
| 4,520,875 A | 6/1985 | Deckler |
| 4,528,804 A | 7/1985 | Williams |
| 4,530,405 A | 7/1985 | White |
| 4,663,918 A | 5/1987 | Williams et al. |
| 4,674,578 A | 6/1987 | Bexten et al. |
| 4,700,784 A | 10/1987 | Wiebe et al. |

(Continued)

FOREIGN PATENT DOCUMENTS

CA        3079392 A1 * 11/2020 ........... A01B 17/002

*Primary Examiner* — Tara Mayo
(74) *Attorney, Agent, or Firm* — Vander Velden Law Firm, LLC; Melinda S. Vander Velden

(57) ABSTRACT

Apparatus and methods for detecting and remediating clogged gauge wheels, closing wheels, and seed tubes of an agricultural planter.

8 Claims, 17 Drawing Sheets

(56) References Cited

U.S. PATENT DOCUMENTS

| | | |
|---|---|---|
| 4,713,665 A | 12/1987 | Phelan |
| 4,728,954 A | 3/1988 | Phelan et al. |
| 4,747,301 A | 5/1988 | Bellanger |
| 4,825,957 A | 5/1989 | White et al. |
| 4,837,691 A | 6/1989 | Boe et al. |
| 4,838,010 A | 6/1989 | Ziegler et al. |
| 4,969,533 A | 11/1990 | Holm et al. |
| 4,991,146 A | 2/1991 | Ransdell et al. |
| 5,060,205 A | 10/1991 | Phelan |
| 5,060,701 A | 10/1991 | McCunn et al. |
| 5,186,261 A | 2/1993 | Will et al. |
| 5,379,847 A | 1/1995 | Snyder |
| 5,524,424 A | 6/1996 | Halgrimson et al. |
| 5,658,087 A | 8/1997 | Butkovich et al. |
| 5,684,476 A | 11/1997 | Anderson |
| 5,717,403 A | 2/1998 | Nelson et al. |
| 5,764,184 A | 6/1998 | Hatch et al. |
| 5,808,582 A | 9/1998 | Woo |
| 5,870,689 A | 2/1999 | Hale et al. |
| 5,884,204 A | 3/1999 | Orbach et al. |
| 5,887,663 A | 3/1999 | Williams |
| 5,894,894 A | 4/1999 | Szymczak |
| 5,901,633 A | 5/1999 | Chan et al. |
| 5,902,343 A | 5/1999 | Hale et al. |
| 5,938,709 A | 8/1999 | Hale et al. |
| 5,947,855 A | 9/1999 | Weiss |
| 5,955,973 A | 9/1999 | Anderson |
| 5,957,304 A | 9/1999 | Dawson |
| 5,961,573 A | 10/1999 | Hale et al. |
| 5,977,778 A | 11/1999 | Chan et al. |
| 5,978,723 A | 11/1999 | Hale et al. |
| 5,991,687 A | 11/1999 | Hale et al. |
| 5,992,534 A | 11/1999 | Callies et al. |
| 5,995,895 A | 11/1999 | Watt et al. |
| 6,005,395 A | 12/1999 | Chan et al. |
| 6,038,500 A | 3/2000 | Weiss |
| 6,061,618 A | 5/2000 | Hale et al. |
| 6,070,673 A | 6/2000 | Wendte |
| 6,112,139 A | 8/2000 | Schubert et al. |
| 6,125,135 A | 9/2000 | Woo et al. |
| 6,131,062 A | 10/2000 | Nielsen |
| 6,131,669 A | 10/2000 | Friggstad et al. |
| 6,141,612 A | 10/2000 | Flamme et al. |
| 6,142,059 A | 11/2000 | Chan et al. |
| 6,160,902 A | 12/2000 | Dickson et al. |
| 6,178,253 B1 | 1/2001 | Hendrickson et al. |
| 6,195,604 B1 | 2/2001 | Moore et al. |
| 6,209,656 B1 | 4/2001 | Gengler et al. |
| 6,259,401 B1 | 7/2001 | Woo |
| 6,278,918 B1 | 8/2001 | Dickson et al. |
| 6,283,222 B2 | 9/2001 | Gengler et al. |
| 6,285,930 B1 | 9/2001 | Dickson et al. |
| 6,292,729 B2 | 9/2001 | Falck et al. |
| 6,305,478 B1 | 10/2001 | Friggstad |
| 6,311,795 B1 | 11/2001 | Skotnikov et al. |
| 6,321,850 B2 | 11/2001 | Friggstad |
| 6,321,851 B1 | 11/2001 | Weiss et al. |
| 6,345,772 B1 | 2/2002 | Bastin et al. |
| 6,347,113 B1 | 2/2002 | Hatch |
| 6,378,621 B1 | 4/2002 | Graham et al. |
| 6,385,515 B1 | 5/2002 | Dickson et al. |
| 6,434,462 B1 | 8/2002 | Bevly et al. |
| 6,438,506 B1 | 8/2002 | Yohpe et al. |
| 6,445,983 B1 | 9/2002 | Dickson et al. |
| 6,490,539 B1 | 12/2002 | Dickson et al. |
| 6,529,615 B2 | 3/2003 | Hendrickson et al. |
| 6,578,907 B2 | 6/2003 | Teich |
| 6,581,695 B2 | 6/2003 | Bernhardt et al. |
| 6,583,754 B2 | 6/2003 | Mertins et al. |
| 6,584,710 B1 | 7/2003 | Lin et al. |
| 6,603,803 B1 | 8/2003 | Hatch |
| 6,606,571 B2 | 8/2003 | Phelan et al. |
| 6,615,570 B2 | 9/2003 | Beck et al. |
| 6,674,687 B2 | 1/2004 | Zeitzew |
| 6,686,951 B1 | 2/2004 | Dickson et al. |
| 6,687,609 B2 | 2/2004 | Hsiao et al. |
| 6,688,403 B2 | 2/2004 | Bernhardt et al. |
| 6,694,260 B1 | 2/2004 | Rekow |
| 6,697,724 B2 | 2/2004 | Beck |
| 6,698,524 B2 | 3/2004 | Bernhardt et al. |
| 6,708,080 B2 | 3/2004 | Benneweis |
| 6,714,662 B1 | 3/2004 | Benson et al. |
| 6,721,453 B1 | 4/2004 | Benson et al. |
| 6,722,994 B2 | 4/2004 | Woods et al. |
| 6,728,607 B1 | 4/2004 | Anderson |
| 6,753,810 B1 | 6/2004 | Yang et al. |
| 6,760,654 B2 | 7/2004 | Beck |
| 6,763,619 B2 | 7/2004 | Hendron et al. |
| 6,769,349 B2 | 8/2004 | Arshad et al. |
| 6,778,894 B2 | 8/2004 | Beck et al. |
| 6,779,623 B2 | 8/2004 | Woods et al. |
| 6,789,014 B1 | 9/2004 | Rekow et al. |
| 6,813,557 B2 | 11/2004 | Schmidt et al. |
| 6,819,780 B2 | 11/2004 | Benson et al. |
| 6,820,699 B1 | 11/2004 | Bettin |
| 6,823,249 B2 | 11/2004 | Moore et al. |
| 6,839,127 B1 | 1/2005 | Anderson |
| 6,839,616 B2 | 1/2005 | Beck |
| 6,864,836 B1 | 3/2005 | Hatch et al. |
| 6,901,319 B1 | 5/2005 | Nelson et al. |
| 6,904,985 B2 | 6/2005 | Ferree et al. |
| 6,907,336 B2 | 6/2005 | Gray et al. |
| 6,915,873 B2 | 7/2005 | Woods et al. |
| 6,934,615 B2 | 8/2005 | Flann et al. |
| 6,934,632 B2 | 8/2005 | Hatch |
| 6,941,208 B2 | 9/2005 | Mahoney et al. |
| 6,942,041 B1 | 9/2005 | Kraus et al. |
| 6,946,749 B2 | 9/2005 | Turner |
| 6,948,784 B2 | 9/2005 | Wodrich et al. |
| 6,963,881 B2 | 11/2005 | Pickett et al. |
| 6,980,895 B2 | 12/2005 | Paice et al. |
| 6,990,399 B2 | 1/2006 | Hrazdera et al. |
| 6,999,877 B1 | 2/2006 | Dyer et al. |
| 7,010,425 B2 | 3/2006 | Gray et al. |
| 7,026,992 B1 | 4/2006 | Hunt et al. |
| 7,047,133 B1 | 5/2006 | Dyer et al. |
| 7,047,135 B2 | 5/2006 | Dyer et al. |
| 7,062,381 B1 | 6/2006 | Rekow et al. |
| 7,064,810 B2 | 6/2006 | Anderson et al. |
| 7,071,870 B2 | 7/2006 | Sharpe et al. |
| 7,073,314 B2 | 7/2006 | Beck et al. |
| 7,073,603 B2 | 7/2006 | Nordhoff |
| 7,079,943 B2 | 7/2006 | Flann et al. |
| 7,082,361 B2 | 7/2006 | Berger et al. |
| 7,110,881 B2 | 9/2006 | Gray et al. |
| 7,117,417 B2 | 10/2006 | Sharpe et al. |
| 7,119,741 B2 | 10/2006 | Sharpe et al. |
| 7,142,150 B2 | 11/2006 | Thackray |
| 7,167,797 B2 | 1/2007 | Faivre et al. |
| 7,184,892 B1 | 2/2007 | Dyer et al. |
| 7,206,063 B2 | 4/2007 | Anderson et al. |
| 7,212,155 B2 | 5/2007 | Hatch et al. |
| 7,216,033 B2 | 5/2007 | Flann et al. |
| 7,228,214 B2 | 6/2007 | Flann et al. |
| 7,231,295 B2 | 6/2007 | Pickett et al. |
| 7,242,791 B2 | 7/2007 | Han et al. |
| 7,248,211 B2 | 7/2007 | Hatch et al. |
| 7,250,901 B2 | 7/2007 | Stephens |
| 7,254,485 B2 | 8/2007 | Rooney et al. |
| 7,266,477 B2 | 9/2007 | Foessel |
| 7,277,784 B2 | 10/2007 | Weiss |
| 7,283,900 B1 | 10/2007 | Gacioch, Jr. et al. |
| 7,286,624 B2 | 10/2007 | Rentz et al. |
| 7,299,056 B2 | 11/2007 | Anderson |
| 7,313,478 B1 | 12/2007 | Anderson et al. |
| 7,315,275 B2 | 1/2008 | Stephens |
| 7,349,779 B2 | 3/2008 | Nelson |
| 7,350,343 B2 | 4/2008 | Beck |
| 7,353,885 B2 | 4/2008 | Nordhoff |
| 7,385,551 B2 | 6/2008 | Stephens |
| 7,397,392 B2 | 7/2008 | Mahoney et al. |
| 7,400,957 B2 | 7/2008 | Hofer et al. |
| 7,403,846 B2 | 7/2008 | Maertens et al. |
| 7,419,345 B2 | 9/2008 | Priepke |

(56) References Cited

U.S. PATENT DOCUMENTS

| | | |
|---|---|---|
| 7,427,945 B2 | 9/2008 | Stephens |
| 7,427,950 B2 | 9/2008 | Eslinger et al. |
| 7,450,080 B2 | 11/2008 | Stephens |
| 7,453,925 B2 | 11/2008 | Keegan et al. |
| 7,466,262 B2 | 12/2008 | Stephens |
| 7,479,922 B2 | 1/2009 | Hunt et al. |
| 7,480,564 B2 | 1/2009 | Metzler et al. |
| 7,503,510 B2 | 3/2009 | Vickers et al. |
| 7,505,848 B2 | 3/2009 | Flann et al. |
| 7,509,199 B2 | 3/2009 | Rekow |
| 7,511,661 B2 | 3/2009 | Hatch et al. |
| 7,544,125 B2 | 6/2009 | Smith |
| 7,580,783 B2 | 8/2009 | Dix |
| 7,591,226 B2 | 9/2009 | Dix et al. |
| 7,593,798 B2 | 9/2009 | Han et al. |
| 7,593,811 B2 | 9/2009 | Schmidt et al. |
| 7,610,122 B2 | 10/2009 | Anderson |
| 7,610,123 B2 | 10/2009 | Han et al. |
| 7,633,437 B2 | 12/2009 | Hatch |
| 7,644,780 B2 | 1/2010 | Harnetiaux et al. |
| 7,645,190 B2 | 1/2010 | Schwinn et al. |
| 7,647,177 B2 | 1/2010 | Schmidt et al. |
| 7,650,734 B2 | 1/2010 | Beck et al. |
| 7,652,618 B2 | 1/2010 | Kearney et al. |
| 7,653,483 B2 | 1/2010 | Schmidt et al. |
| 7,679,555 B2 | 3/2010 | Dai et al. |
| 7,689,356 B2 | 3/2010 | Dix et al. |
| 7,706,948 B2 | 4/2010 | Dix et al. |
| 7,715,966 B2 | 5/2010 | Dix et al. |
| 7,715,979 B2 | 5/2010 | Dix |
| 7,720,598 B2 | 5/2010 | Schmidt et al. |
| 7,721,516 B2 | 5/2010 | Wendling |
| 7,725,113 B2 | 5/2010 | Fiedelak et al. |
| 7,729,830 B2 | 6/2010 | Tarasinski et al. |
| 7,748,147 B2 | 7/2010 | Schoenmaker et al. |
| 7,748,488 B2 | 7/2010 | Tarasinski et al. |
| 7,752,778 B2 | 7/2010 | Schoenmaker et al. |
| 7,752,779 B2 | 7/2010 | Schoenmaker et al. |
| 7,756,623 B2 | 7/2010 | Jarrett et al. |
| 7,779,616 B2 | 8/2010 | Sheidler et al. |
| 7,788,889 B2 | 9/2010 | Sheidler |
| 7,797,860 B2 | 9/2010 | Schoenmaker et al. |
| 7,801,481 B2 | 9/2010 | Knight |
| 7,832,223 B2 | 11/2010 | Arshad et al. |
| 7,844,380 B2 | 11/2010 | Han et al. |
| 7,844,396 B2 | 11/2010 | Zeitzew |
| 7,849,932 B2 | 12/2010 | Friggstad et al. |
| 7,857,237 B2 | 12/2010 | Vickers et al. |
| 7,860,145 B2 | 12/2010 | Knight et al. |
| 7,861,794 B2 | 1/2011 | Tarasinski et al. |
| 7,877,182 B2 | 1/2011 | Dix et al. |
| 7,894,951 B2 | 2/2011 | Norris et al. |
| 7,904,226 B2 | 3/2011 | Dix |
| 7,905,297 B2 | 3/2011 | Fox et al. |
| 7,912,158 B2 | 3/2011 | Cahn et al. |
| 7,916,898 B2 | 3/2011 | Anderson |
| 7,938,613 B2 | 5/2011 | Yoder et al. |
| 7,957,850 B2 | 6/2011 | Anderson |
| 7,961,141 B2 | 6/2011 | Dai et al. |
| 7,961,143 B2 | 6/2011 | Dai et al. |
| 8,020,657 B2 | 9/2011 | Allard et al. |
| 8,028,499 B2 | 10/2011 | Viaud |
| 8,035,552 B2 | 10/2011 | Dai et al. |
| 8,060,269 B2 | 11/2011 | Dix |
| 8,060,306 B2 | 11/2011 | Puhalla et al. |
| 8,074,754 B2 | 12/2011 | Gouker |
| 8,090,514 B2 | 1/2012 | Tarasinski et al. |
| 8,112,202 B2 | 2/2012 | Fackler et al. |
| 8,126,620 B2 | 2/2012 | Ringwald et al. |
| 8,131,432 B2 | 3/2012 | Senneff et al. |
| 8,145,390 B2 | 3/2012 | Dix et al. |
| 8,150,574 B2 | 4/2012 | Han et al. |
| 8,160,765 B2 | 4/2012 | Morselli et al. |
| 8,186,449 B2 | 5/2012 | Hackert et al. |
| 8,190,364 B2 | 5/2012 | Rekow |
| 8,195,342 B2 | 6/2012 | Anderson |
| 8,195,364 B2 | 6/2012 | Norris et al. |
| 8,209,075 B2 | 6/2012 | Senneff et al. |
| 8,209,095 B2 | 6/2012 | Mackin et al. |
| 8,224,516 B2 | 7/2012 | Anderson |
| 8,229,618 B2 | 7/2012 | Tolstedt et al. |
| 8,234,010 B2 | 7/2012 | Thompson et al. |
| 8,242,953 B2 | 8/2012 | Dai et al. |
| 8,243,772 B2 | 8/2012 | Knight et al. |
| 8,260,499 B2 | 9/2012 | Boydell |
| 8,280,590 B2 | 10/2012 | Mackin et al. |
| 8,280,595 B2 | 10/2012 | Foster et al. |
| 8,296,052 B2 | 10/2012 | Dix et al. |
| 8,306,699 B2 | 11/2012 | Scheer |
| 8,306,727 B2 | 11/2012 | Morselli et al. |
| 8,335,653 B2 | 12/2012 | Pruett et al. |
| 8,340,438 B2 | 12/2012 | Anderson |
| 8,342,255 B2 | 1/2013 | Connors et al. |
| 8,346,443 B2 | 1/2013 | Senneff et al. |
| 8,359,139 B2 | 1/2013 | Wang et al. |
| 8,364,366 B2 | 1/2013 | Foessel et al. |
| 8,365,679 B2 | 2/2013 | Landphair et al. |
| 8,366,372 B2 | 2/2013 | Yoder et al. |
| 8,392,065 B2 | 3/2013 | Tolstedt et al. |
| 8,401,743 B2 | 3/2013 | Harber et al. |
| 8,407,157 B2 | 3/2013 | Anderson |
| 8,408,149 B2 | 4/2013 | Rylander |
| 8,416,133 B2 | 4/2013 | Hatch et al. |
| 8,427,365 B2 | 4/2013 | Dai et al. |
| 8,433,483 B2 | 4/2013 | Han et al. |
| 8,437,901 B2 | 5/2013 | Anderson |
| 8,442,700 B2 | 5/2013 | Anderson |
| 8,456,353 B2 | 6/2013 | Dai et al. |
| 8,473,140 B2 | 6/2013 | Norris et al. |
| 8,478,493 B2 | 7/2013 | Anderson |
| 8,490,371 B2 | 7/2013 | Roberge |
| 8,498,786 B2 | 7/2013 | Anderson |
| 8,498,796 B2 | 7/2013 | Norris et al. |
| 8,500,387 B2 | 8/2013 | Trifunovic |
| 8,505,808 B2 | 8/2013 | Peterson et al. |
| 8,510,034 B2 | 8/2013 | Norris et al. |
| 8,522,756 B2 | 9/2013 | Vuk et al. |
| 8,544,964 B2 | 10/2013 | Rekow et al. |
| 8,560,145 B2 | 10/2013 | Anderson |
| 8,567,551 B2 | 10/2013 | Trifunovic |
| 8,573,337 B1 | 11/2013 | Luoma et al. |
| 8,576,056 B2 | 11/2013 | Clair et al. |
| 8,577,558 B2 | 11/2013 | Mitchell |
| 8,583,312 B2 | 11/2013 | Schreiber |
| 8,599,027 B2 | 12/2013 | Sanchez |
| 8,602,135 B2 | 12/2013 | Kraus |
| 8,626,390 B2 | 1/2014 | Prickel et al. |
| 8,626,441 B2 | 1/2014 | Matthews |
| 8,635,011 B2 | 1/2014 | Senneff et al. |
| 8,635,015 B2 | 1/2014 | Anderson |
| 8,640,785 B2 | 2/2014 | Diaz et al. |
| 8,649,940 B2 | 2/2014 | Bonefas |
| 8,659,474 B2 | 2/2014 | Dai et al. |
| 8,660,724 B2 | 2/2014 | Tarasinski et al. |
| 8,665,145 B2 | 3/2014 | Dai et al. |
| 8,666,554 B2 | 3/2014 | Anderson |
| 8,682,573 B2 | 3/2014 | Anderson |
| 8,694,382 B2 | 4/2014 | Aznavorian et al. |
| 8,700,263 B2 | 4/2014 | Matthews |
| 8,712,144 B2 | 4/2014 | Mas et al. |
| 8,731,826 B2 | 5/2014 | Matthews |
| 8,737,720 B2 | 5/2014 | Mas et al. |
| 8,738,238 B2 | 5/2014 | Rekow |
| 8,744,626 B2 | 6/2014 | Johnson et al. |
| 8,755,974 B2 | 6/2014 | Matthews |
| 8,766,848 B2 | 7/2014 | Dai et al. |
| 8,789,563 B2 | 7/2014 | Wenzel |
| 8,803,736 B2 | 8/2014 | Dai et al. |
| 8,818,567 B2 | 8/2014 | Anderson |
| 8,820,039 B2 | 9/2014 | Werning |
| 8,825,294 B2 | 9/2014 | Norris et al. |
| 8,825,310 B2 | 9/2014 | Kowalchuk |
| 8,825,311 B2 | 9/2014 | Kowalchuk |
| 8,827,001 B2 | 9/2014 | Wendte et al. |

(56) References Cited

U.S. PATENT DOCUMENTS

| | | |
|---|---|---|
| 8,840,357 B2 | 9/2014 | Anderson |
| 8,843,269 B2 | 9/2014 | Anderson et al. |
| 8,855,405 B2 | 10/2014 | Mas et al. |
| 8,868,304 B2 | 10/2014 | Bonefas |
| 8,874,261 B2 | 10/2014 | Hein et al. |
| 8,874,300 B2 | 10/2014 | Allard et al. |
| 8,909,389 B2 | 12/2014 | Meyer |
| 8,914,198 B2 | 12/2014 | Prickel et al. |
| 8,930,095 B2 | 1/2015 | Anderson |
| 8,931,245 B2 | 1/2015 | Roberge |
| 8,939,250 B2 | 1/2015 | Turner et al. |
| 8,942,157 B2 | 1/2015 | Keegan |
| 8,942,860 B2 | 1/2015 | Morselli |
| 8,942,897 B2 | 1/2015 | Foster et al. |
| 8,948,974 B2 | 2/2015 | Montocchio |
| 8,948,975 B2 | 2/2015 | Peterson et al. |
| 8,983,685 B2 | 3/2015 | Dai et al. |
| 8,989,946 B2 | 3/2015 | Anderson |
| 8,989,972 B2 | 3/2015 | Anderson |
| 8,991,274 B2 | 3/2015 | Tuttle |
| 8,996,171 B2 | 3/2015 | Anderson et al. |
| 9,002,591 B2 | 4/2015 | Wang et al. |
| 9,008,918 B2 | 4/2015 | Missotten et al. |
| 9,014,901 B2 | 4/2015 | Wang et al. |
| 9,026,315 B2 | 5/2015 | Anderson |
| 9,036,682 B2 | 5/2015 | Keegan et al. |
| 9,038,755 B2 | 5/2015 | Sedoni et al. |
| 9,043,016 B2 | 5/2015 | Filippov et al. |
| 9,043,078 B2 | 5/2015 | Johnson et al. |
| 9,043,129 B2 | 5/2015 | Bonefas et al. |
| 9,048,964 B2 | 6/2015 | Keegan et al. |
| 9,066,464 B2 | 6/2015 | Schmidt et al. |
| 9,066,465 B2 | 6/2015 | Hendrickson et al. |
| 9,072,213 B2 | 7/2015 | Connell et al. |
| 9,072,227 B2 | 7/2015 | Wenzel |
| 9,079,482 B2 | 7/2015 | Besler et al. |
| 9,085,203 B2 | 7/2015 | Duppong et al. |
| 9,086,699 B2 | 7/2015 | Pirotais |
| 9,096,264 B2 | 8/2015 | Connors et al. |
| 9,098,080 B2 | 8/2015 | Norris et al. |
| 9,098,085 B2 | 8/2015 | Aznavorian et al. |
| 9,101,090 B2 | 8/2015 | Pierce et al. |
| 9,113,588 B2 | 8/2015 | Kormann |
| 9,114,822 B2 | 8/2015 | Prickel et al. |
| 9,114,832 B2 | 8/2015 | Wang et al. |
| 9,119,342 B2 | 9/2015 | Bonefas |
| 9,139,222 B2 | 9/2015 | Potter et al. |
| 9,150,104 B2 | 10/2015 | Kellum |
| 9,169,973 B2 | 10/2015 | Nickel |
| 9,180,889 B2 | 11/2015 | Upchurch et al. |
| 9,184,973 B2 | 11/2015 | Yu et al. |
| 9,188,980 B2 | 11/2015 | Anderson |
| 9,194,936 B1 | 11/2015 | Keegan |
| 9,196,100 B1 | 11/2015 | Kilworth et al. |
| 9,197,285 B2 | 11/2015 | Yu |
| 9,227,474 B2 | 1/2016 | Liu |
| 9,232,688 B2 | 1/2016 | Kormann et al. |
| 9,235,214 B2 | 1/2016 | Anderson |
| 9,242,671 B2 | 1/2016 | Potter et al. |
| 9,261,576 B2 | 2/2016 | Keegan et al. |
| 9,265,194 B2 | 2/2016 | Mangen et al. |
| 9,269,200 B2 | 2/2016 | Schmidt |
| 9,274,524 B2 | 3/2016 | Anderson |
| 9,282,693 B2 | 3/2016 | Anderson |
| 9,290,093 B2 | 3/2016 | Turner et al. |
| 9,296,411 B2 | 3/2016 | Hornberger |
| 9,301,446 B2 | 4/2016 | Peters et al. |
| 9,303,998 B2 | 4/2016 | Schmidt |
| 9,310,464 B2 | 4/2016 | Keegan |
| 9,313,944 B1 | 4/2016 | Faivre et al. |
| 9,313,951 B2 | 4/2016 | Herman et al. |
| 9,320,196 B2 | 4/2016 | Dybro et al. |
| 9,320,197 B2 | 4/2016 | Peters et al. |
| 9,326,443 B2 | 5/2016 | Zametzer et al. |
| 9,326,444 B2 | 5/2016 | Bonefas |
| 9,329,078 B1 | 5/2016 | Mundhenke et al. |
| 9,345,194 B2 | 5/2016 | Schroeder et al. |
| 9,357,759 B2 | 6/2016 | Anderson |
| 9,357,760 B2 | 6/2016 | Anderson |
| 9,370,138 B2 | 6/2016 | Bebernes et al. |
| 9,374,939 B2 | 6/2016 | Pickett et al. |
| 9,379,765 B2 | 6/2016 | Yu et al. |
| 9,380,737 B2 | 7/2016 | Bebernes et al. |
| 9,383,430 B2 | 7/2016 | Keegan |
| 9,386,738 B2 | 7/2016 | Peterson et al. |
| 9,392,746 B2 | 7/2016 | Darr et al. |
| 9,396,153 B2 | 7/2016 | Peters et al. |
| 9,405,039 B2 | 8/2016 | Anderson |
| 9,415,953 B2 | 8/2016 | Bonefas |
| 9,429,944 B2 | 8/2016 | Filippov et al. |
| 9,438,991 B2 | 9/2016 | Sanchez et al. |
| 9,439,341 B2 | 9/2016 | Bebernes et al. |
| 9,445,546 B2 | 9/2016 | May |
| 9,452,702 B2 | 9/2016 | Stander et al. |
| 9,457,841 B2 | 10/2016 | Smith et al. |
| 9,457,971 B2 | 10/2016 | Bonefas et al. |
| 9,462,748 B2 | 10/2016 | Dollinger et al. |
| 9,463,939 B2 | 10/2016 | Bonefas et al. |
| 9,468,145 B2 | 10/2016 | Coppinger et al. |
| 9,482,740 B2 | 11/2016 | Keegan |
| 9,485,914 B2 | 11/2016 | Schleicher et al. |
| 9,510,508 B2 | 12/2016 | Jung |
| 9,511,633 B2 | 12/2016 | Anderson et al. |
| 9,511,958 B2 | 12/2016 | Bonefas |
| 9,513,932 B2 | 12/2016 | Andersen et al. |
| 9,516,802 B2 | 12/2016 | Zemenchik |
| 9,522,791 B2 | 12/2016 | Bonefas et al. |
| 9,522,792 B2 | 12/2016 | Bonefas et al. |
| 9,523,180 B2 | 12/2016 | Deines |
| 9,526,211 B2 | 12/2016 | Murray et al. |
| 9,527,211 B2 | 12/2016 | Posselius et al. |
| 9,529,364 B2 | 12/2016 | Foster et al. |
| 9,532,499 B2 | 1/2017 | Anderson et al. |
| 9,541,648 B2 | 1/2017 | Ralphs et al. |
| 9,545,048 B2 | 1/2017 | Pickett et al. |
| 9,550,527 B2 | 1/2017 | Brooks |
| 9,554,499 B2 | 1/2017 | Müller et al. |
| 9,558,600 B2 | 1/2017 | Rice et al. |
| 9,563,492 B2 | 2/2017 | Bell et al. |
| 9,565,802 B2 | 2/2017 | Schleicher |
| 9,573,583 B2 | 2/2017 | Rindfleisch et al. |
| 9,581,691 B2 | 2/2017 | Simicevic et al. |
| 9,599,721 B2 | 3/2017 | Pai et al. |
| 9,615,501 B2 | 4/2017 | Pickett et al. |
| 9,633,491 B2 | 4/2017 | Wonderlich |
| 9,635,798 B2 | 5/2017 | Merx et al. |
| 9,641,962 B2 | 5/2017 | Kilworth et al. |
| 9,645,006 B2 | 5/2017 | Phelan et al. |
| 9,646,430 B2 | 5/2017 | Runde |
| 9,668,400 B2 | 6/2017 | Follmer |
| 9,668,420 B2 | 6/2017 | Anderson et al. |
| 9,675,008 B1 | 6/2017 | Rusciolelli et al. |
| 9,693,503 B2 | 7/2017 | Dybro et al. |
| 9,696,162 B2 | 7/2017 | Anderson |
| 9,699,968 B2 | 7/2017 | Posselius et al. |
| 9,706,698 B2 | 7/2017 | Kinder et al. |
| 9,709,969 B2 | 7/2017 | Anderson et al. |
| 9,716,926 B2 | 7/2017 | Johnson et al. |
| 9,717,172 B2 | 8/2017 | Johnson et al. |
| 9,718,507 B2 | 8/2017 | Ricketts et al. |
| 9,740,208 B2 | 8/2017 | Sugumaran et al. |
| 9,750,173 B2 | 9/2017 | Dix et al. |
| 9,765,690 B2 | 9/2017 | Ritter et al. |
| 9,771,079 B2 | 9/2017 | Omran et al. |
| 9,772,625 B2 | 9/2017 | Gilmore et al. |
| 9,791,863 B2 | 10/2017 | Derscheid et al. |
| 9,795,074 B2 | 10/2017 | Stratton et al. |
| 9,801,331 B2 | 10/2017 | Foster et al. |
| 9,801,332 B2 | 10/2017 | Landphair et al. |
| 9,803,324 B2 | 10/2017 | Kean et al. |
| 9,807,931 B2 | 11/2017 | Corbett et al. |
| 9,807,932 B2 | 11/2017 | French, Jr. et al. |
| 9,807,934 B2 | 11/2017 | Rusciolelli et al. |
| 9,811,087 B2 | 11/2017 | Nelson et al. |

(56) References Cited

U.S. PATENT DOCUMENTS

| | | |
|---|---|---|
| 9,819,925 B2 | 11/2017 | Posselius et al. |
| 9,821,847 B2 | 11/2017 | Robinson et al. |
| 9,826,673 B1 | 11/2017 | Ray et al. |
| 9,826,674 B2 | 11/2017 | Matthews |
| 9,832,928 B2 | 12/2017 | Dybro et al. |
| 9,832,930 B2 | 12/2017 | Herron |
| 9,834,248 B2 | 12/2017 | Nelson et al. |
| 9,846,241 B2 | 12/2017 | Dai et al. |
| 9,848,528 B2 | 12/2017 | Werner et al. |
| 9,849,828 B2 | 12/2017 | Foster et al. |
| 9,849,909 B2 | 12/2017 | Wang et al. |
| 9,854,725 B2 | 1/2018 | Gunlogson et al. |
| 9,861,024 B2 | 1/2018 | Vogler et al. |
| 9,861,040 B2 | 1/2018 | Bonefas |
| 9,867,325 B2 | 1/2018 | Clifford et al. |
| 9,867,334 B2 | 1/2018 | Jongmans et al. |
| 9,872,428 B2 | 1/2018 | Bernier et al. |
| 9,873,449 B2 | 1/2018 | Magisson et al. |
| 9,877,426 B2 | 1/2018 | Mangen et al. |
| 9,880,535 B2 | 1/2018 | Henry |
| 9,880,559 B2 | 1/2018 | Putkonen et al. |
| 9,880,560 B2 | 1/2018 | Han et al. |
| 9,891,629 B2 | 2/2018 | Murray et al. |
| 9,901,021 B2 | 2/2018 | Phan et al. |
| 9,903,947 B2 | 2/2018 | Das et al. |
| 9,903,979 B2 | 2/2018 | Dybro et al. |
| 9,904,290 B2 | 2/2018 | Pickett et al. |
| 9,915,952 B2 | 3/2018 | Dollinger et al. |
| 9,921,064 B2 | 3/2018 | Schleicher |
| 9,927,242 B2 | 3/2018 | Schleicher |
| 9,930,824 B2 | 4/2018 | Nafziger et al. |
| 9,932,043 B2 | 4/2018 | Chaston et al. |
| 9,949,423 B2 | 4/2018 | Foster et al. |
| 9,950,734 B2 | 4/2018 | Bebernes et al. |
| 9,952,596 B2 | 4/2018 | Foster et al. |
| 9,968,023 B2 | 5/2018 | Brooks et al. |
| 9,968,025 B2 | 5/2018 | Bunderson et al. |
| 9,973,710 B2 | 5/2018 | Boydens et al. |
| 9,974,225 B2 | 5/2018 | Bunderson et al. |
| 9,983,589 B2 | 5/2018 | Foster et al. |
| 9,989,636 B2 | 6/2018 | Sherlock |
| 9,989,835 B1 | 6/2018 | Gomez et al. |
| 9,992,932 B2 | 6/2018 | Bonefas et al. |
| 9,994,264 B2 | 6/2018 | Salvini |
| 10,005,500 B2 | 6/2018 | Huenemann et al. |
| 10,010,021 B2 | 7/2018 | Foster et al. |
| 10,018,171 B1 | 7/2018 | Breiner et al. |
| 10,028,424 B2 | 7/2018 | Zemenchik et al. |
| 10,031,525 B2 | 7/2018 | Dix et al. |
| 10,034,425 B2 | 7/2018 | Ducroquet et al. |
| 10,037,630 B2 | 7/2018 | So et al. |
| 10,037,634 B2 | 7/2018 | Christofferson et al. |
| 10,039,231 B2 | 8/2018 | Anderson et al. |
| 10,039,234 B2 | 8/2018 | Missotten et al. |
| 10,040,327 B2 | 8/2018 | Chmelar et al. |
| 10,048,385 B2 | 8/2018 | Yu et al. |
| 10,051,774 B2 | 8/2018 | Henry et al. |
| 10,053,100 B2 | 8/2018 | Foster et al. |
| 10,053,146 B2 | 8/2018 | Morselli et al. |
| 10,064,333 B2 | 9/2018 | Duquesne et al. |
| 10,072,385 B2 | 9/2018 | Kean et al. |
| 10,073,457 B2 | 9/2018 | Foster et al. |
| 10,080,325 B2 | 9/2018 | Weisberg et al. |
| 10,085,371 B2 | 10/2018 | Sudbrink et al. |
| 10,088,842 B2 | 10/2018 | Schmidt et al. |
| 10,091,929 B2 | 10/2018 | Henry et al. |
| 10,094,470 B2 | 10/2018 | Omran et al. |
| 10,095,235 B2 | 10/2018 | Sugumaran et al. |
| 10,096,174 B2 | 10/2018 | Watson et al. |
| 10,096,179 B2 | 10/2018 | Runde |
| 10,102,690 B2 | 10/2018 | Bell et al. |
| 10,102,693 B1 | 10/2018 | Wu |
| 10,111,386 B2 | 10/2018 | Farley et al. |
| 10,114,348 B2 | 10/2018 | Gilmore et al. |
| 10,114,378 B2 | 10/2018 | Korthals et al. |
| 10,117,374 B2 | 11/2018 | Boydens et al. |
| 10,119,244 B2 | 11/2018 | Elkins |
| 10,123,475 B2 | 11/2018 | Posselius et al. |
| 10,124,827 B2 | 11/2018 | NyKamp et al. |
| 10,126,282 B2 | 11/2018 | Anderson et al. |
| 10,132,259 B1 | 11/2018 | Watson et al. |
| 10,139,234 B2 | 11/2018 | Matthews |
| 10,143,126 B2 | 12/2018 | Foster et al. |
| 10,144,390 B1 | 12/2018 | Chaston et al. |
| 10,144,453 B2 | 12/2018 | Bunderson et al. |
| 10,150,483 B2 | 12/2018 | Procuniar et al. |
| 10,152,891 B2 | 12/2018 | Rusciolelli et al. |
| 10,153,543 B2 | 12/2018 | Foster et al. |
| 10,159,177 B2 | 12/2018 | Gervais et al. |
| 10,165,722 B2 | 1/2019 | Ackerman et al. |
| 10,165,725 B2 | 1/2019 | Sugumaran et al. |
| 10,172,274 B2 | 1/2019 | Connell et al. |
| 10,178,828 B2 | 1/2019 | Hendrickson et al. |
| 10,179,604 B2 | 1/2019 | Rotole et al. |
| 10,179,606 B2 | 1/2019 | Bebernes et al. |
| 10,180,328 B2 | 1/2019 | Matthews |
| 10,183,667 B2 | 1/2019 | Anderson et al. |
| 10,185,317 B2 | 1/2019 | Pichlmaier et al. |
| 10,188,021 B2 | 1/2019 | Foster et al. |
| 10,188,024 B2 | 1/2019 | Rusciolelli et al. |
| 10,188,037 B2 | 1/2019 | Bruns et al. |
| 10,191,157 B2 | 1/2019 | Pai et al. |
| 10,194,575 B2 | 2/2019 | Schmidt |
| 10,194,578 B2 | 2/2019 | Williams |
| 10,194,581 B2 | 2/2019 | Mangen et al. |
| 10,194,585 B2 | 2/2019 | Aesaert et al. |
| 10,201,022 B2 | 2/2019 | Matthews |
| 10,207,689 B2 | 2/2019 | Mueller et al. |
| 10,207,735 B2 | 2/2019 | Bebernes et al. |
| 10,212,874 B2 | 2/2019 | Matthews |
| 10,217,066 B1 | 2/2019 | Margherio et al. |
| 10,219,422 B2 | 3/2019 | Buhler et al. |
| 10,222,483 B2 | 3/2019 | Dai et al. |
| 10,222,484 B2 | 3/2019 | Dai et al. |
| 10,225,978 B1 | 3/2019 | Schoeny et al. |
| 10,225,979 B2 | 3/2019 | Trask |
| 10,231,376 B1 | 3/2019 | Stanhope et al. |
| 10,234,368 B2 | 3/2019 | Cherney |
| 10,234,837 B2 | 3/2019 | French, Jr. |
| 10,241,209 B2 | 3/2019 | Feldhaus et al. |
| 10,245,915 B2 | 4/2019 | Kerner et al. |
| 10,251,329 B2 | 4/2019 | Foster et al. |
| 10,252,285 B2 | 4/2019 | Barker et al. |
| 10,254,147 B2 | 4/2019 | Vermue et al. |
| 10,254,765 B2 | 4/2019 | Rekow |
| 10,255,670 B1 * | 4/2019 | Wu et al. ............... H04N 7/183 |
| 10,262,411 B2 | 4/2019 | Kean |
| 10,276,037 B2 | 4/2019 | Meiners |
| 10,281,905 B2 | 5/2019 | French, Jr. |
| 10,286,893 B2 | 5/2019 | Woopen et al. |
| 10,292,323 B2 | 5/2019 | Missotten et al. |
| 10,295,703 B2 | 5/2019 | Dybro et al. |
| 10,299,422 B2 | 5/2019 | Schleicher et al. |
| 10,310,455 B2 | 6/2019 | Blank et al. |
| 10,314,224 B2 | 6/2019 | Turpin et al. |
| 10,315,655 B2 | 6/2019 | Blank et al. |
| 10,318,609 B2 | 6/2019 | Blank et al. |
| 10,338,232 B2 | 7/2019 | Zhang et al. |
| 10,342,173 B2 | 7/2019 | Heinrich et al. |
| 10,351,364 B2 | 7/2019 | Green et al. |
| 10,352,255 B2 | 7/2019 | Pipho et al. |
| 10,369,872 B2 | 8/2019 | Jackson |
| 10,371,558 B2 | 8/2019 | Tevs et al. |
| 10,372,126 B2 | 8/2019 | Foster et al. |
| 10,379,225 B2 | 8/2019 | Dai et al. |
| 10,380,808 B2 | 8/2019 | Sherlock |
| 10,380,811 B1 | 8/2019 | Stuart et al. |
| 10,386,496 B2 | 8/2019 | Dai et al. |
| 10,386,844 B2 | 8/2019 | Wilcox et al. |
| 10,390,472 B2 | 8/2019 | Matthews |
| 10,390,474 B2 | 8/2019 | Kelley et al. |
| 10,392,016 B2 | 8/2019 | Gorczowski |
| 10,393,882 B2 | 8/2019 | Dai et al. |
| 10,394,238 B2 | 8/2019 | Foster et al. |

(56) References Cited

U.S. PATENT DOCUMENTS

| | | |
|---|---|---|
| 10,398,084 B2 | 9/2019 | Ray et al. |
| 10,407,879 B2 | 9/2019 | Gonzalez et al. |
| 10,408,645 B2 | 9/2019 | Blank et al. |
| 10,417,842 B2 | 9/2019 | Runde |
| 11,315,258 B1* | 4/2022 | Anagnostopoulos ........................ A01B 69/001 |
| 2002/0116107 A1 | 8/2002 | Mahoney et al. |
| 2003/0112152 A1 | 6/2003 | Pickett |
| 2003/0120418 A1 | 6/2003 | Treichel |
| 2003/0130766 A1 | 7/2003 | Braunhardt et al. |
| 2004/0021563 A1 | 2/2004 | Mahoney et al. |
| 2004/0054457 A1 | 3/2004 | Kormann |
| 2005/0146428 A1 | 7/2005 | Mahoney et al. |
| 2006/0020402 A1 | 1/2006 | Bischoff et al. |
| 2006/0041354 A1 | 2/2006 | Schick et al. |
| 2006/0046895 A1 | 3/2006 | Thacher et al. |
| 2006/0070757 A1 | 4/2006 | Posselius et al. |
| 2006/0106535 A1 | 5/2006 | Duncan et al. |
| 2006/0190163 A1 | 8/2006 | Anderson |
| 2006/0217993 A1 | 9/2006 | Anderson |
| 2007/0003107 A1 | 1/2007 | Wei et al. |
| 2007/0039745 A1 | 2/2007 | Anderson et al. |
| 2007/0089390 A1 | 4/2007 | Hendrickson et al. |
| 2007/0175680 A1 | 8/2007 | Gouker |
| 2007/0250412 A1 | 10/2007 | Anderson |
| 2007/0282527 A1 | 12/2007 | Han et al. |
| 2008/0046130 A1 | 2/2008 | Faivre et al. |
| 2008/0053742 A1 | 3/2008 | Hublart et al. |
| 2008/0065286 A1 | 3/2008 | Han et al. |
| 2008/0122687 A1 | 5/2008 | Nelson et al. |
| 2009/0018712 A1 | 1/2009 | Duncan et al. |
| 2009/0099775 A1 | 4/2009 | Mott et al. |
| 2009/0112472 A1 | 4/2009 | Montgomery |
| 2009/0157259 A1 | 6/2009 | Han et al. |
| 2009/0199530 A1 | 8/2009 | Salley et al. |
| 2009/0240430 A1 | 9/2009 | Sachs et al. |
| 2009/0272551 A1 | 11/2009 | Thompson et al. |
| 2010/0023228 A1 | 1/2010 | Montgomery |
| 2010/0152943 A1 | 6/2010 | Matthews |
| 2010/0161183 A1 | 6/2010 | Beese |
| 2011/0046780 A1 | 2/2011 | Anderson |
| 2011/0046784 A1 | 2/2011 | Anderson |
| 2011/0046836 A1 | 2/2011 | Anderson |
| 2011/0077827 A1 | 3/2011 | Arshad et al. |
| 2011/0084851 A1 | 4/2011 | Peterson et al. |
| 2011/0089752 A1 | 4/2011 | Frediani et al. |
| 2011/0100656 A1 | 5/2011 | Connors et al. |
| 2011/0153143 A1 | 6/2011 | O'Neil et al. |
| 2011/0153338 A1 | 6/2011 | Anderson |
| 2011/0160961 A1 | 6/2011 | Wollenhaupt et al. |
| 2011/0160994 A1 | 6/2011 | Schmidt et al. |
| 2011/0166705 A1 | 7/2011 | Anderson et al. |
| 2011/0178635 A1 | 7/2011 | Anderson et al. |
| 2011/0209631 A1 | 9/2011 | Viaud |
| 2011/0213531 A1 | 9/2011 | Farley et al. |
| 2011/0270724 A1 | 11/2011 | O'Neil et al. |
| 2011/0295423 A1 | 12/2011 | Anderson |
| 2011/0311342 A1 | 12/2011 | Montgomery |
| 2012/0072317 A1 | 3/2012 | O'Neil |
| 2012/0072533 A1 | 3/2012 | O'Neil |
| 2012/0095638 A1 | 4/2012 | Anderson |
| 2012/0101679 A1 | 4/2012 | Anderson et al. |
| 2012/0101725 A1 | 4/2012 | Kondekar |
| 2012/0143429 A1 | 6/2012 | Anderson |
| 2012/0143642 A1 | 6/2012 | O'Neil |
| 2012/0158247 A1 | 6/2012 | Norris et al. |
| 2012/0186213 A1* | 7/2012 | Orlando et al. ..... A01B 69/008 172/3 |
| 2012/0215394 A1 | 8/2012 | Wang et al. |
| 2012/0253581 A1 | 10/2012 | Anderson |
| 2013/0019580 A1 | 1/2013 | Anderson et al. |
| 2013/0046418 A1 | 2/2013 | Anderson |
| 2013/0046446 A1 | 2/2013 | Anderson |
| 2013/0054075 A1 | 2/2013 | Montgomery |
| 2013/0054078 A1 | 2/2013 | Anderson |
| 2013/0166132 A1 | 6/2013 | Matthews |
| 2013/0166157 A1 | 6/2013 | Schleicher et al. |
| 2013/0173116 A1 | 7/2013 | Gustafson et al. |
| 2013/0197773 A1 | 8/2013 | Shuler et al. |
| 2013/0220652 A1 | 8/2013 | Thompson et al. |
| 2013/0282200 A1 | 10/2013 | Anderson |
| 2013/0289817 A1 | 10/2013 | Kellum |
| 2014/0121882 A1 | 5/2014 | Gilmore et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2014/0259897 A1 | 9/2014 | Godbole et al. |
| 2014/0262559 A1 | 9/2014 | DeChristopher et al. |
| 2014/0277905 A1 | 9/2014 | Anderson |
| 2015/0045992 A1 | 2/2015 | Ashby et al. |
| 2015/0070209 A1 | 3/2015 | Keegan et al. |
| 2015/0094953 A1 | 4/2015 | Montgomery |
| 2015/0145720 A1 | 5/2015 | Matthews |
| 2015/0241879 A1 | 8/2015 | Peterson |
| 2015/0301532 A1 | 10/2015 | Norris et al. |
| 2015/0319913 A1 | 11/2015 | Foster et al. |
| 2015/0348419 A1 | 12/2015 | Matthews |
| 2016/0029547 A1 | 2/2016 | Casper et al. |
| 2016/0033651 A1 | 2/2016 | Johnson et al. |
| 2016/0071410 A1* | 3/2016 | Rupp et al. ........ A01D 41/1274 701/50 |
| 2016/0134844 A1* | 5/2016 | Casper et al. ......... H04N 7/181 348/135 |
| 2016/0196700 A1 | 7/2016 | O'Neil et al. |
| 2016/0202357 A1 | 7/2016 | Matthews |
| 2016/0231427 A1 | 8/2016 | Matthews |
| 2016/0238711 A1 | 8/2016 | Matthews |
| 2016/0302357 A1 | 10/2016 | Tippery et al. |
| 2016/0360697 A1 | 12/2016 | Diaz |
| 2016/0368011 A1 | 12/2016 | Feldhaus et al. |
| 2016/0377736 A1 | 12/2016 | Zeitzew et al. |
| 2017/0010619 A1 | 1/2017 | Foster et al. |
| 2017/0013778 A1 | 1/2017 | Borry et al. |
| 2017/0055455 A1 | 3/2017 | Missotten et al. |
| 2017/0071122 A1 | 3/2017 | Schmidt |
| 2017/0086373 A1 | 3/2017 | Mahieu et al. |
| 2017/0086377 A1 | 3/2017 | Jongmans et al. |
| 2017/0112043 A1 | 4/2017 | Nair et al. |
| 2017/0197621 A1 | 7/2017 | Foster et al. |
| 2017/0212247 A1 | 7/2017 | Chen et al. |
| 2017/0221280 A1 | 8/2017 | Chaston et al. |
| 2017/0228145 A1 | 8/2017 | Schneider et al. |
| 2017/0231146 A1 | 8/2017 | Romig et al. |
| 2017/0261978 A1 | 9/2017 | Gresch |
| 2017/0269202 A1 | 9/2017 | Baum et al. |
| 2017/0269216 A1 | 9/2017 | Dai et al. |
| 2017/0269224 A1 | 9/2017 | Zhang et al. |
| 2017/0269225 A1 | 9/2017 | Dai et al. |
| 2017/0269231 A1 | 9/2017 | Dai et al. |
| 2017/0269564 A1 | 9/2017 | Anderson et al. |
| 2017/0299728 A1 | 10/2017 | Lie et al. |
| 2017/0299730 A1 | 10/2017 | Lie et al. |
| 2017/0299731 A1 | 10/2017 | Lie et al. |
| 2017/0320492 A1 | 11/2017 | Ferrari et al. |
| 2017/0322301 A1 | 11/2017 | Ferrari et al. |
| 2017/0323263 A1 | 11/2017 | Foster et al. |
| 2017/0325399 A1 | 11/2017 | Heinrich et al. |
| 2017/0339820 A1 | 11/2017 | Foster et al. |
| 2017/0339822 A1 | 11/2017 | Gresch et al. |
| 2017/0355264 A1 | 12/2017 | Foster et al. |
| 2017/0355398 A1 | 12/2017 | Dix et al. |
| 2017/0356406 A1 | 12/2017 | Jacobsthal et al. |
| 2017/0357267 A1 | 12/2017 | Foster et al. |
| 2017/0357400 A1 | 12/2017 | Foster et al. |
| 2018/0022402 A1 | 1/2018 | Hamilton et al. |
| 2018/0024252 A1 | 1/2018 | Vogler et al. |
| 2018/0025561 A1 | 1/2018 | Bueermann |
| 2018/0050724 A1 | 2/2018 | Morselli et al. |
| 2018/0054954 A1 | 3/2018 | Nale et al. |
| 2018/0077851 A1 | 3/2018 | Hatton |
| 2018/0079271 A1 | 3/2018 | Zwanzger et al. |
| 2018/0084710 A1 | 3/2018 | Lawson |
| 2018/0092301 A1 | 4/2018 | Vandike et al. |
| 2018/0105037 A1 | 4/2018 | Müller et al. |

(56) References Cited

U.S. PATENT DOCUMENTS

| | | |
|---|---|---|
| 2018/0108980 A1 | 4/2018 | Foster et al. |
| 2018/0170274 A1 | 6/2018 | Gomez et al. |
| 2018/0171590 A1 | 6/2018 | Kean |
| 2018/0184581 A1* | 7/2018 | Morgan et al. ..... G01N 21/4738 |
| 2018/0188366 A1 | 7/2018 | Kemmer et al. |
| 2018/0192575 A1 | 7/2018 | Sudbrink et al. |
| 2018/0196438 A1 | 7/2018 | Newlin et al. |
| 2018/0196441 A1 | 7/2018 | Muench et al. |
| 2018/0201268 A1 | 7/2018 | Palmroth et al. |
| 2018/0201310 A1 | 7/2018 | Rotole |
| 2018/0210450 A1 | 7/2018 | Ferrari et al. |
| 2018/0223502 A1 | 8/2018 | Kenkel et al. |
| 2018/0232674 A1 | 8/2018 | Bilde |
| 2018/0238823 A1 | 8/2018 | Puhalla et al. |
| 2018/0242517 A1 | 8/2018 | Davis et al. |
| 2018/0243771 A1 | 8/2018 | Davis et al. |
| 2018/0243772 A1 | 8/2018 | Davis et al. |
| 2018/0243773 A1 | 8/2018 | Davis et al. |
| 2018/0243774 A1 | 8/2018 | Davis et al. |
| 2018/0266829 A1 | 9/2018 | Fritz et al. |
| 2018/0279539 A1 | 10/2018 | Wägner |
| 2018/0279599 A1 | 10/2018 | Struve |
| 2018/0281852 A1 | 10/2018 | Eagles |
| 2018/0310474 A1 | 11/2018 | Posselius et al. |
| 2018/0313958 A1 | 11/2018 | Yu et al. |
| 2018/0319392 A1 | 11/2018 | Posselius et al. |
| 2018/0319396 A1 | 11/2018 | Foster et al. |
| 2018/0321683 A1 | 11/2018 | Foster et al. |
| 2018/0325012 A1 | 11/2018 | Ferrari et al. |
| 2018/0325013 A1 | 11/2018 | Boydens et al. |
| 2018/0325014 A1 | 11/2018 | Debbaut |
| 2018/0325028 A1 | 11/2018 | Rotole et al. |
| 2018/0325029 A1 | 11/2018 | Rotole et al. |
| 2018/0325031 A1 | 11/2018 | Rotole et al. |
| 2018/0325032 A1 | 11/2018 | Rotole et al. |
| 2018/0326989 A1 | 11/2018 | Foster et al. |
| 2018/0334186 A1 | 11/2018 | Bebernes et al. |
| 2018/0338413 A1 | 11/2018 | Connell et al. |
| 2018/0338422 A1 | 11/2018 | Brubaker |
| 2018/0346020 A1 | 12/2018 | Bebernes et al. |
| 2018/0359905 A1 | 12/2018 | Foster et al. |
| 2018/0359906 A1 | 12/2018 | Foster et al. |
| 2018/0359908 A1 | 12/2018 | Kelley et al. |
| 2018/0359917 A1 | 12/2018 | Blank et al. |
| 2018/0359919 A1 | 12/2018 | Blank et al. |
| 2018/0364698 A1 | 12/2018 | Blank et al. |
| 2018/0364726 A1 | 12/2018 | Foster et al. |
| 2018/0364739 A1 | 12/2018 | Foster et al. |
| 2018/0373256 A1 | 12/2018 | Runde et al. |
| 2018/0373257 A1 | 12/2018 | Runde et al. |
| 2019/0000007 A1 | 1/2019 | Schleicher et al. |
| 2019/0008088 A1 | 1/2019 | Posselius et al. |
| 2019/0014723 A1 | 1/2019 | Stanhope et al. |
| 2019/0018414 A1 | 1/2019 | Guzmann |
| 2019/0021226 A1 | 1/2019 | Dima et al. |
| 2019/0047010 A1 | 2/2019 | Barker et al. |
| 2019/0059199 A1 | 2/2019 | Stanhope |
| 2019/0064795 A1 | 2/2019 | Berggren et al. |
| 2019/0071115 A1 | 3/2019 | Brooks et al. |
| 2019/0077456 A1 | 3/2019 | Bunderson et al. |
| 2019/0082582 A1 | 3/2019 | Ackerman et al. |
| 2019/0097310 A1 | 3/2019 | Foster et al. |
| 2019/0098824 A1 | 4/2019 | Kovach |
| 2019/0098846 A1 | 4/2019 | Murphy |
| 2019/0101921 A1 | 4/2019 | Anderson |
| 2019/0102623 A1 | 4/2019 | Flood et al. |
| 2019/0111744 A1 | 4/2019 | Billich |
| 2019/0113936 A1 | 4/2019 | Anderson et al. |
| 2019/0114847 A1 | 4/2019 | Wagner et al. |
| 2019/0116726 A1 | 4/2019 | Paralikar et al. |
| 2019/0120973 A1 | 4/2019 | Martin et al. |
| 2019/0124825 A1 | 5/2019 | Anderson |
| 2019/0124826 A1 | 5/2019 | Pickett et al. |
| 2019/0124844 A1 | 5/2019 | Lovett et al. |
| 2019/0126308 A1 | 5/2019 | Hendrickson et al. |
| 2019/0128293 A1 | 5/2019 | Maro |
| 2019/0128864 A1 | 5/2019 | Pickett et al. |
| 2019/0129690 A1 | 5/2019 | Anderson |
| 2019/0133022 A1 | 5/2019 | Connell et al. |
| 2019/0135066 A1 | 5/2019 | Schwalbe et al. |
| 2019/0141878 A1 | 5/2019 | Foster et al. |
| 2019/0141883 A1 | 5/2019 | Zemenchik |
| 2019/0146426 A1 | 5/2019 | Blank |
| 2019/0150352 A1 | 5/2019 | Salzman |
| 2019/0162551 A1 | 5/2019 | Kean |
| 2019/0174560 A1 | 6/2019 | Matthews |
| 2019/0174667 A1 | 6/2019 | Gresch et al. |
| 2019/0188613 A1 | 6/2019 | Margherio et al. |
| 2019/0193559 A1 | 6/2019 | Trowbridge |
| 2019/0198015 A1 | 6/2019 | Cherney et al. |
| 2019/0204095 A1 | 7/2019 | Anderson |
| 2019/0220023 A1 | 7/2019 | Noess |
| 2019/0220024 A1 | 7/2019 | Noess |
| 2019/0220031 A1 | 7/2019 | Noess |
| 2019/0230843 A1 | 8/2019 | Ricketts et al. |
| 2019/0230845 A1 | 8/2019 | Buchner et al. |
| 2019/0230855 A1 | 8/2019 | Reed et al. |
| 2019/0232735 A1 | 8/2019 | Salzman |
| 2019/0235529 A1 | 8/2019 | Barrick et al. |
| 2019/0248421 A1 | 8/2019 | Jacobsthal et al. |
| 2019/0254223 A1* | 8/2019 | Eichhorn et al. ...... A01B 63/16 |
| 2019/0257678 A1 | 8/2019 | Posselius et al. |
| 2019/0258271 A1 | 8/2019 | Sporrer et al. |
| 2019/0261560 A1 | 8/2019 | Jelenkovic |
| 2019/0277687 A1 | 9/2019 | Blank et al. |
| 2020/0387720 A1* | 12/2020 | Stanhope ............... A01B 79/02 |

* cited by examiner

METHODS FOR DETECTING AND CLEARING DEBRIS FROM PLANTER GAUGE WHEELS, CLOSING WHEELS AND SEED TUBES

CROSS-REFERENCE TO RELATED APPLICATIONS

This application claims priority to U.S. Provisional Patent Application No. 62/978,558, filed on Feb. 19, 2020, the entirety of which is hereby incorporated herein by reference.

FIELD OF THE INVENTION

This invention relates generally to autonomous operation of an agricultural implement. In particular, this invention provides for methods and apparatus for detecting when a gauge wheel, closing wheel, disc opener, trash wheel or row cleaner, or seed tube of an agricultural planter is clogged with debris and for clearing debris from the clogged wheel or seed tube.

BACKGROUND

Agricultural planters are typically equipped with one or more gauge wheels located near the opening blade or disc opener on each row unit. A gauge wheel regulates the depth at which seeds are planted in the row. Planters are also typically equipped with a closing wheel in each row that covers the seeds with soil after they have been planted and closes the furrow. Typically there are two gauge wheels on each side of the opening blade of a planter. Seed drills may have only one gauge wheel. A trash wheel or row cleaner is typically disposed before the disc openers, and pushes debris out of the way of the row unit.

While operating an agricultural planter in a field, the gauge wheels, trash wheels, disc openers, and closing wheels occasionally become clogged with plant matter, soil, and other debris that is present on or near the surface of the soil. Traditionally the planter is pulled by a tractor with a human operator in the cab who visually monitors how the planter is performing and can manually detect and remedy clogs or other issues as they occur. However, when the planter is pulled by an autonomous vehicle in the absence of a human operator or constant supervision, clogging of one or more gauge wheels or closing wheels can go undetected and detrimentally affect the planting operation. An undetected clog in a gauge wheel can cause seeds to be planted at the wrong depth or deposited on top of the soil. A clogged closing wheel can prevent seeds from being covered properly, prevent the furrow from being closed, or can even cause planted seeds to be scraped out of the soil as the debris is dragged over the just-planted row. An undetected clog in a trash wheel will accumulate matter in front of the planter. Therefore, a system and methods for automatically detecting and clearing debris from planter gauge wheels, trash wheels, disc openers, and closing wheels is desired.

Agricultural planters are also typically equipped with seed tubes, which are lengths of tubing that run from the seed hopper to the ground. During normal operation, seeds fall through the tube into the furrow. In some instances, mud or other debris becomes lodged in the seed tube, preventing seeds from falling into the furrow. When the planter is pulled by a manned vehicle, the human operator monitors whether the planter is operating normally. If the operator determines a seed tube is clogged, the vehicle is stopped, and the operator manually clears the obstruction. However, when the planter is pulled by an autonomous vehicle, a clogged seed tube may go undetected, causing one or more rows to go unplanted. Therefore, a system and methods for automatically detecting and clearing debris from seed tubes is desired.

BRIEF SUMMARY

In accordance with various embodiments of the invention, methods for detecting and clearing a clogged gauge wheel, disc opener, trash wheel, or closing wheel on an agricultural planter are provided. Throughout this disclosure, gauge wheels, disc openers, trash wheels, and closing wheels will be referred to collectively as "rotating elements." In one embodiment, a hall effect sensor is mounted adjacent to the rotating element such that pulses read by the hall effect sensor indicate that the rotating element is moving and the wheel is operating normally. Likewise, an absence of pulses read by the hall effect sensor indicates that the rotating element is not moving, and a clog has occurred.

In many cases, rotating elements are clogged by a mass of soil, plant matter, or other debris accumulating in front of the rotating element. In another embodiment, a mass of debris is sensed using a mass sensor mounted ahead of the rotating element, indicating that the rotating element is clogged or is likely to clog soon. In another embodiment, a mass of debris is sensed using an infrared sensor mounted ahead of the rotating element.

In another embodiment, whether a rotating element is clogged is determined using image processing techniques. One or more cameras may be mounted on the tractor or near a rotating element, and image processing techniques applied to determine if a rotating element is moving. Alternatively, one or more backward-looking cameras may be mounted near a rotating element, and image processing techniques applied to determine if a clog has occurred. Alternatively, one or more downward-facing cameras may be used to determine if a rotating element is moving.

In another embodiment, a vibration sensor is mounted on the row unit to determine if the vibration being experienced matches a typical vibration signature of a normally operating row unit. The row unit may be modified to deliberately create a unique vibration signature.

In another embodiment, a microphone is mounted on or near the row unit to determine if the sound created by the row unit matches a typical audible signature of a normally operating row unit. The row unit may be modified to deliberately create a unique audible signature.

In another embodiment, a clogged rotating element is detected using a battery powered accelerometer mounted to the rotating element to determine if the motion experienced by the accelerometer matches a typical motion signature of a normally operating row unit.

In another embodiment, a clogged rotating element is cleared using a motor coupled to the rotating element such that rotation of the motor spins the wheel. When a clog is detected using one of the previously described clog detection methods, the row unit is lifted briefly and the motor rotated, forcing the debris from the clogged wheel. For the purpose of clearing debris, the rotating element may be rotated in the same direction as in normal operation, or the direction of rotation may be reversed. In another embodiment, a clogged rotating element is cleared using a spring mechanism coupled to the gauge wheel or closing wheel. As the planter advances through the field, the spring is wound up. Releasing the spring mechanism causes the gauge wheel or closing wheel to rotate, forcing the debris from the clogged rotating element.

In another embodiment, the existing air supply present on a typical planter is connected to the seed tube using tubing and connector. When a clogged seed tube is detected, compressed air is forced through the blocked tube, forcing the debris out of the tube and allowing normal planting to proceed.

BRIEF DESCRIPTION OF THE DRAWINGS

Figure 1:
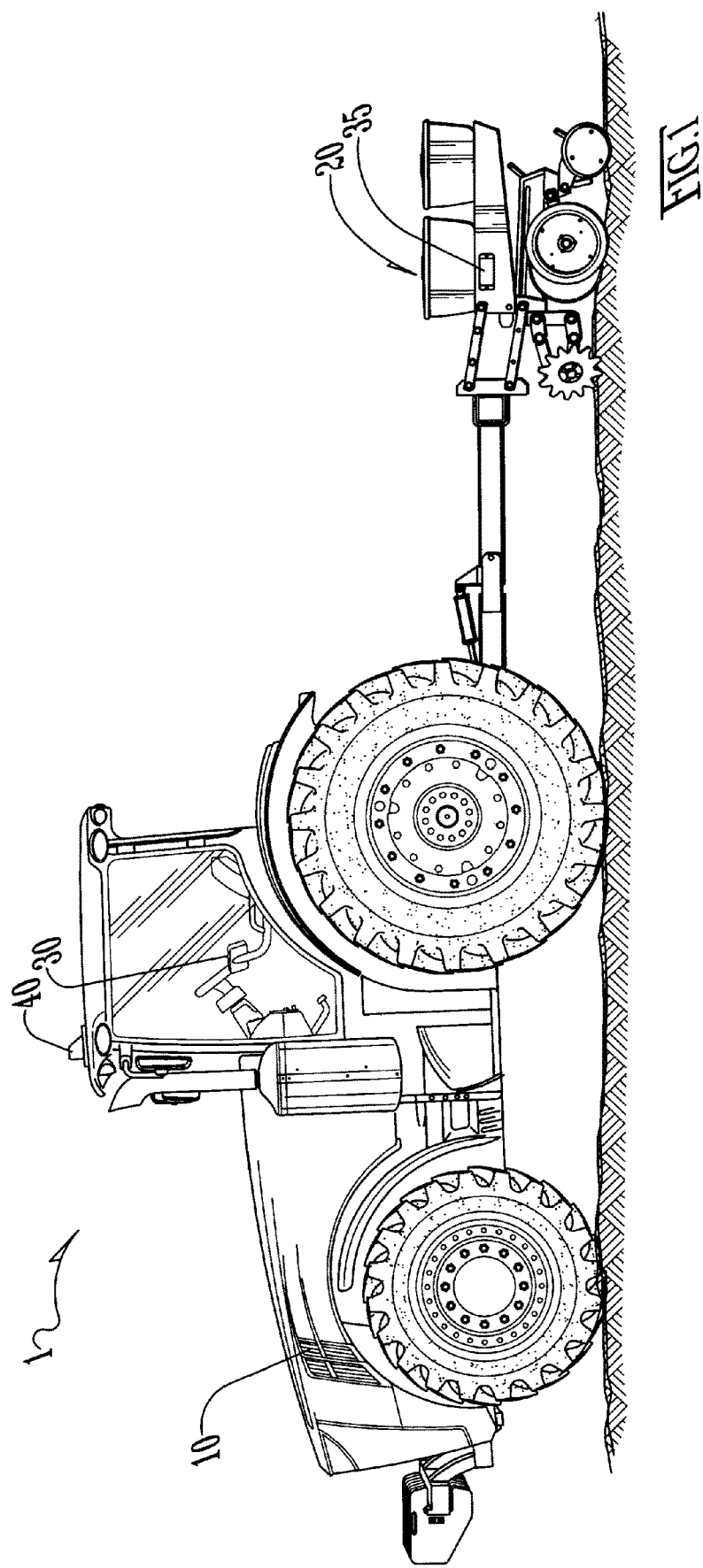

Having thus described the invention in general terms, reference will now be made to the accompanying drawings, which are not necessarily drawn to scale, and wherein:

FIG. 1 illustrates a typical tractor and planter arrangement.

Figure 2:
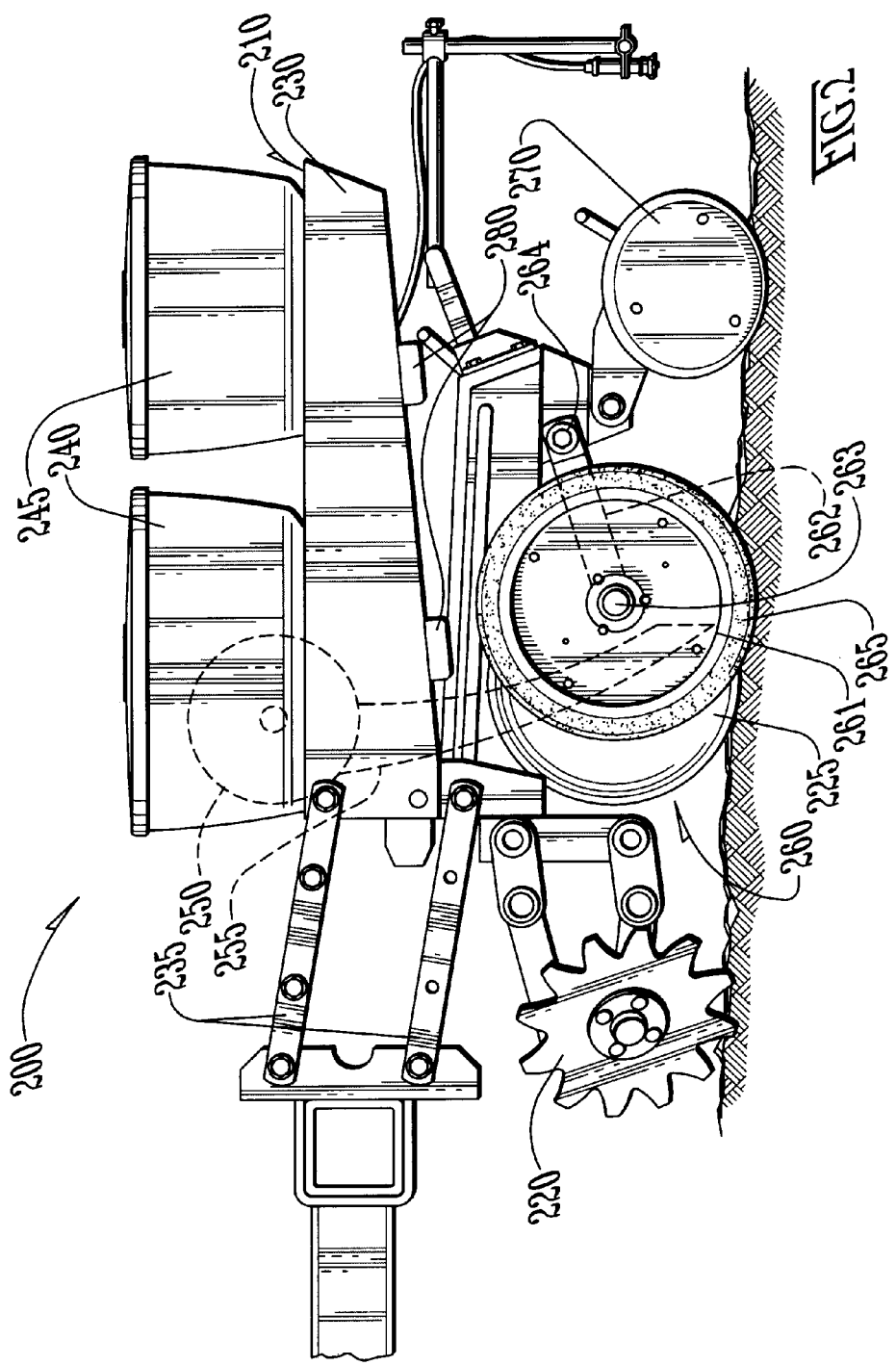

FIG. 2 illustrates an apparatus for detecting a clogged rotating element using a hall effect sensor in accordance with an embodiment of the invention.

Figure 3:
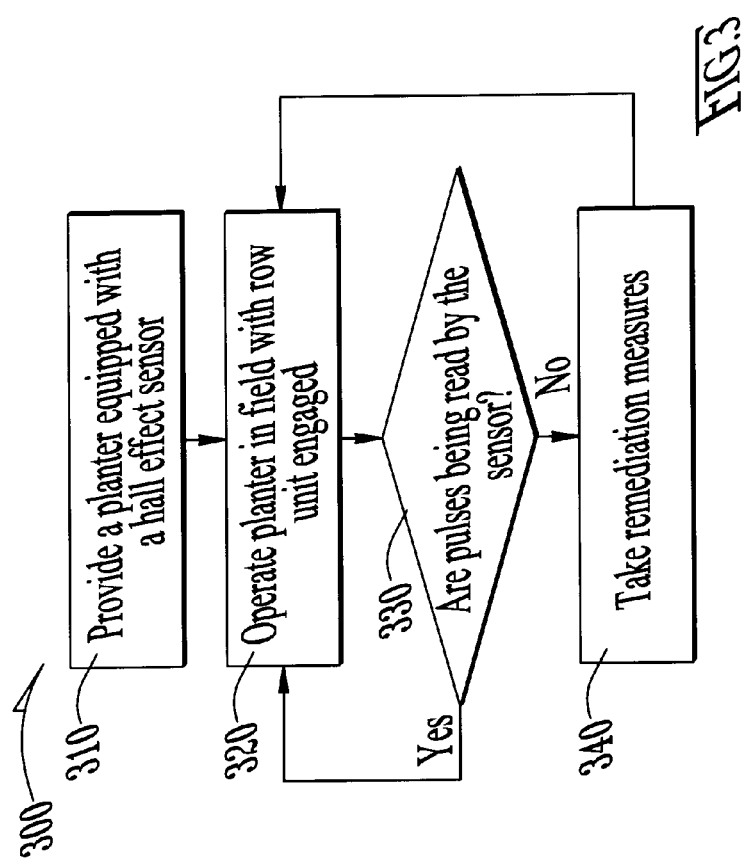

FIG. 3 illustrates a method for detecting a clogged rotating element using a hall effect sensor in accordance with an embodiment of the invention.

Figure 4:
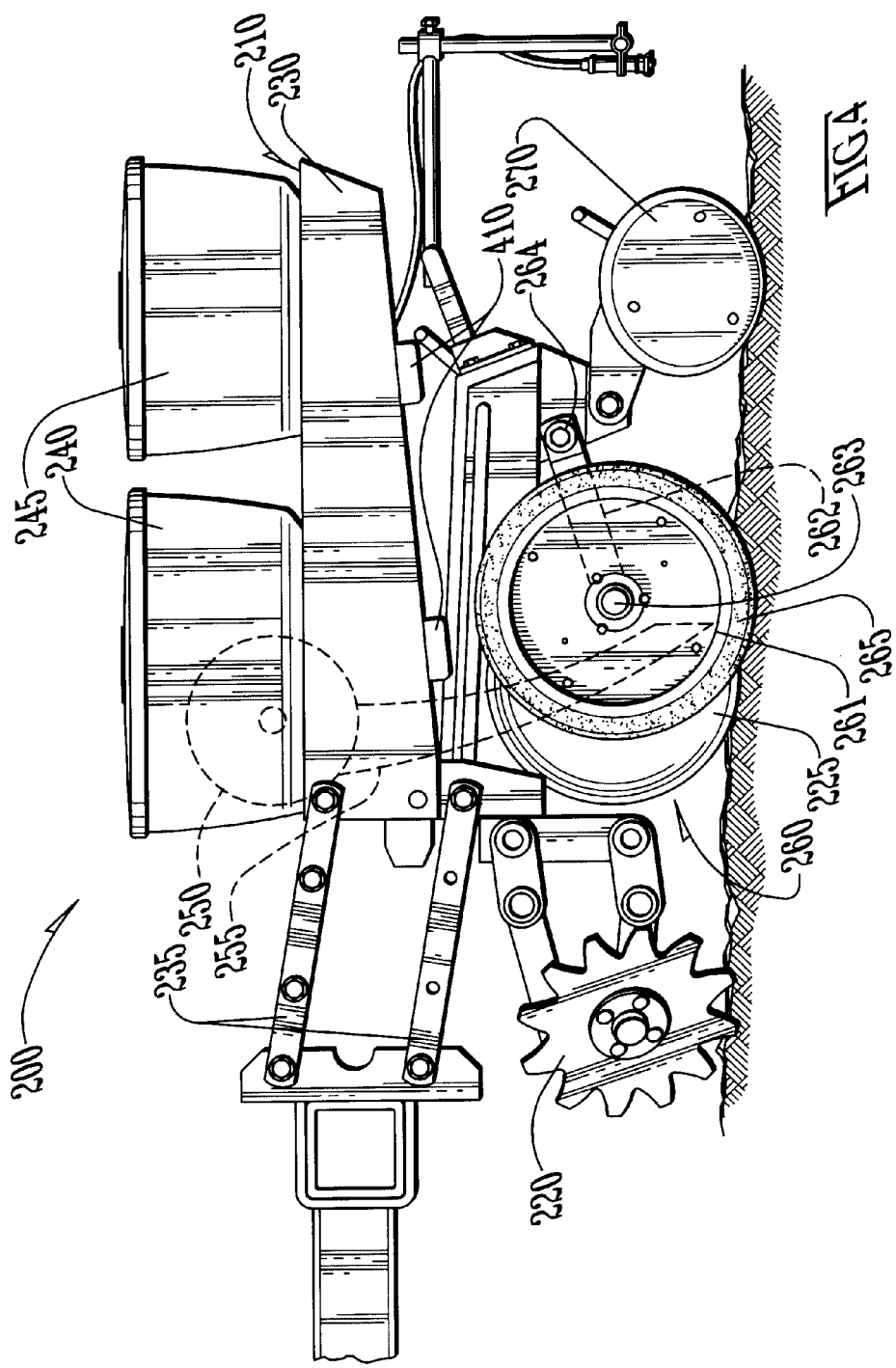

FIG. 4 illustrates an apparatus for detecting a clogged rotating element using an infrared sensor in accordance with an embodiment of the invention.

Figure 5:
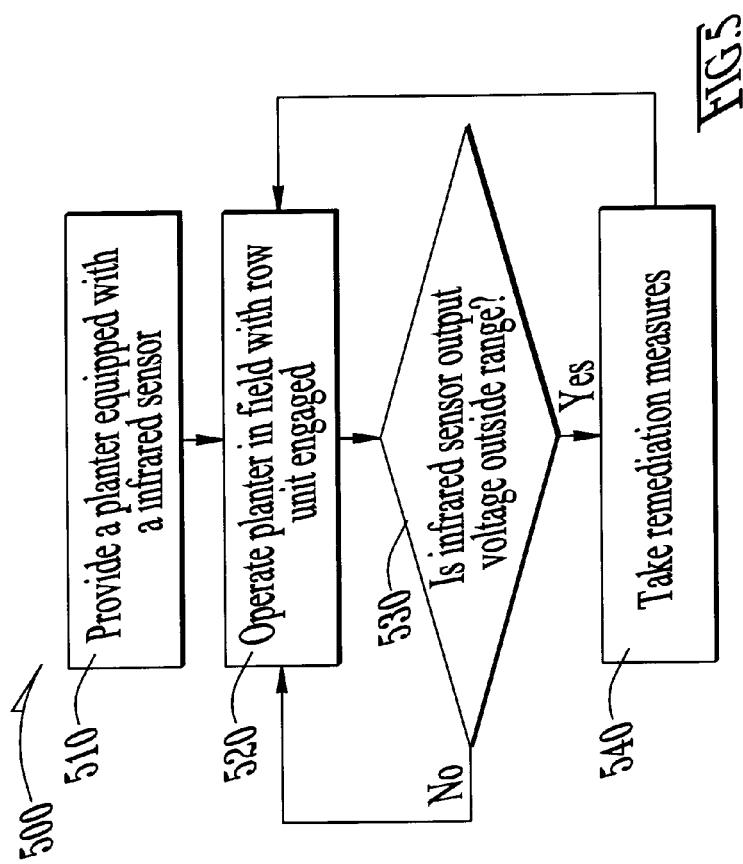

FIG. 5 illustrates a method for detecting a clogged rotating element using an infrared sensor in accordance with an embodiment of the invention.

Figure 6:
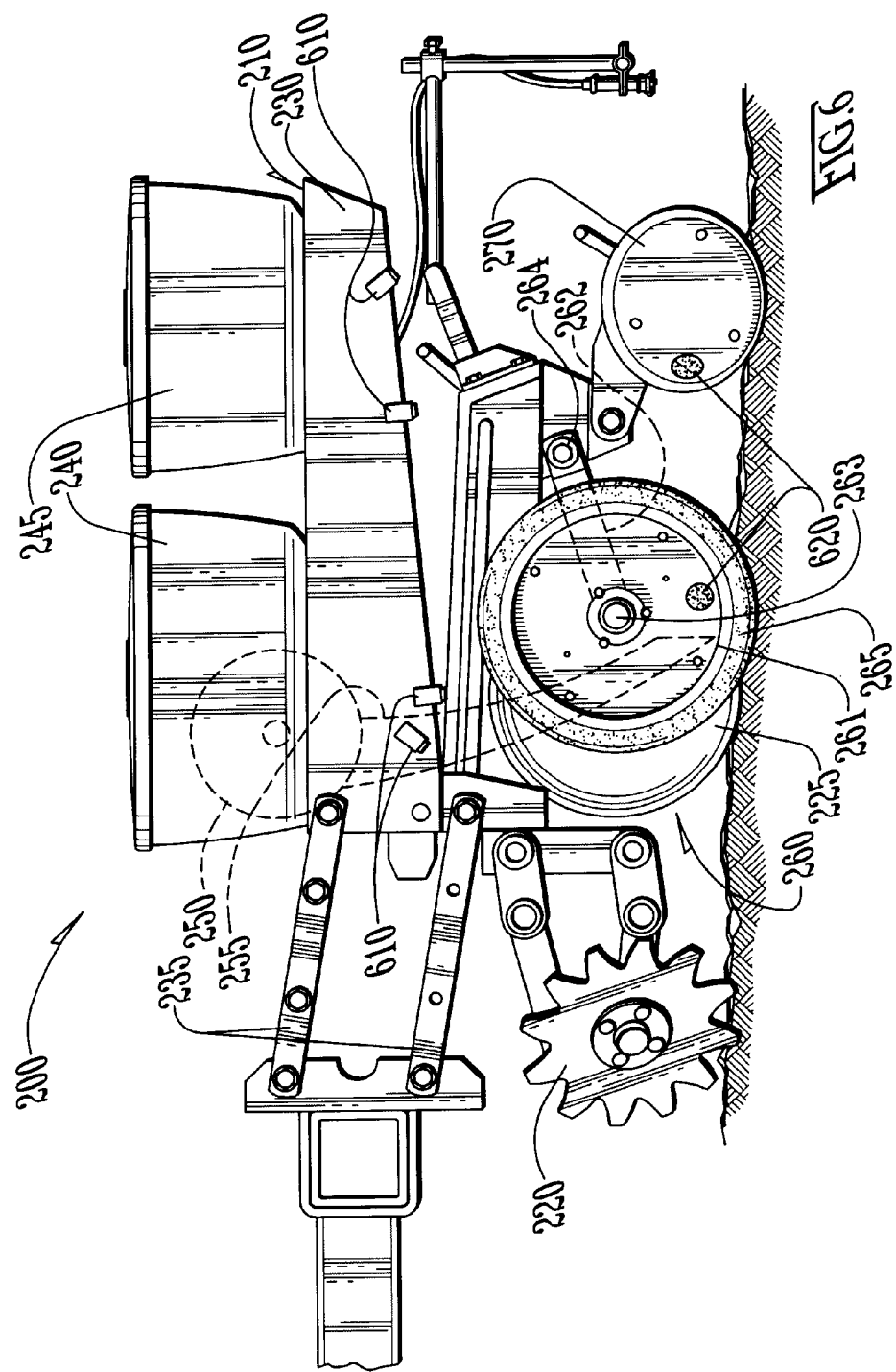

FIG. 6 illustrates an apparatus for detecting a clogged rotating element using one or more cameras in accordance with an embodiment of the invention.

Figure 7:
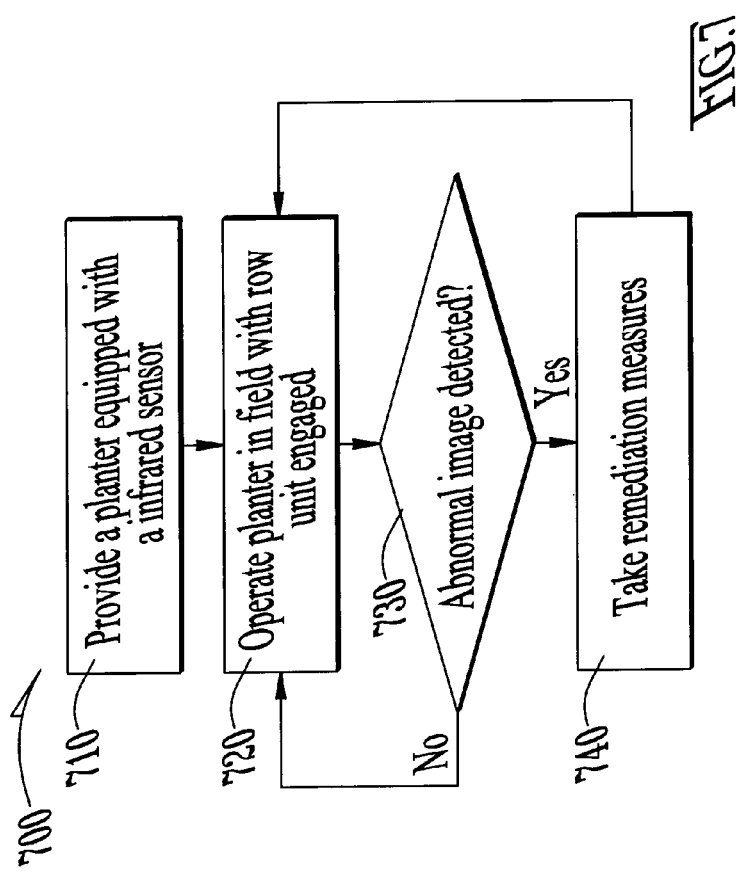

FIG. 7 illustrates a method for detecting a clogged rotating element using image processing techniques in accordance with an embodiment of the invention.

Figure 8:
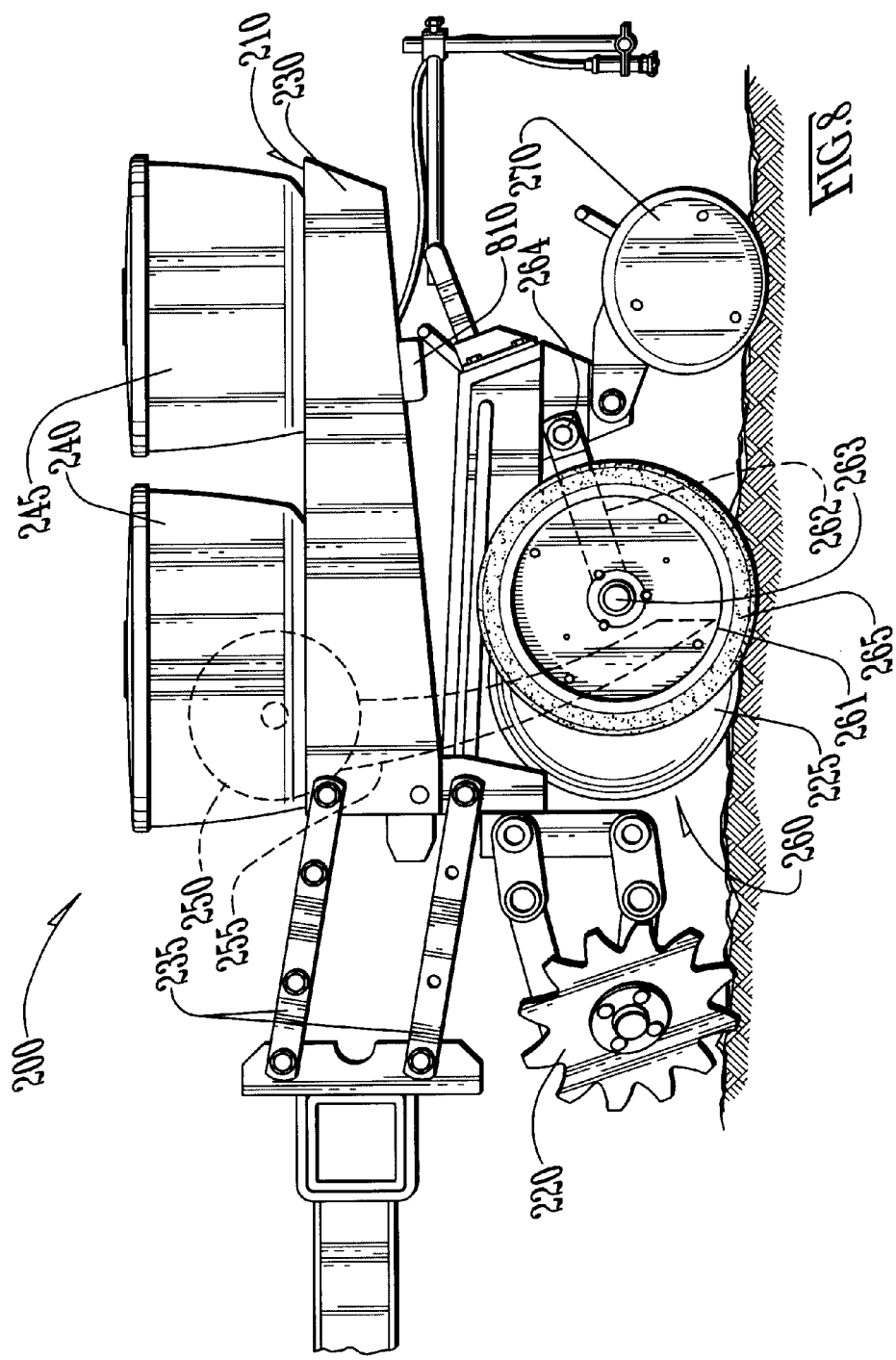

FIG. 8 illustrates an apparatus for detecting a clogged rotating element using one or more vibration sensors in accordance with an embodiment of the invention.

Figure 9:
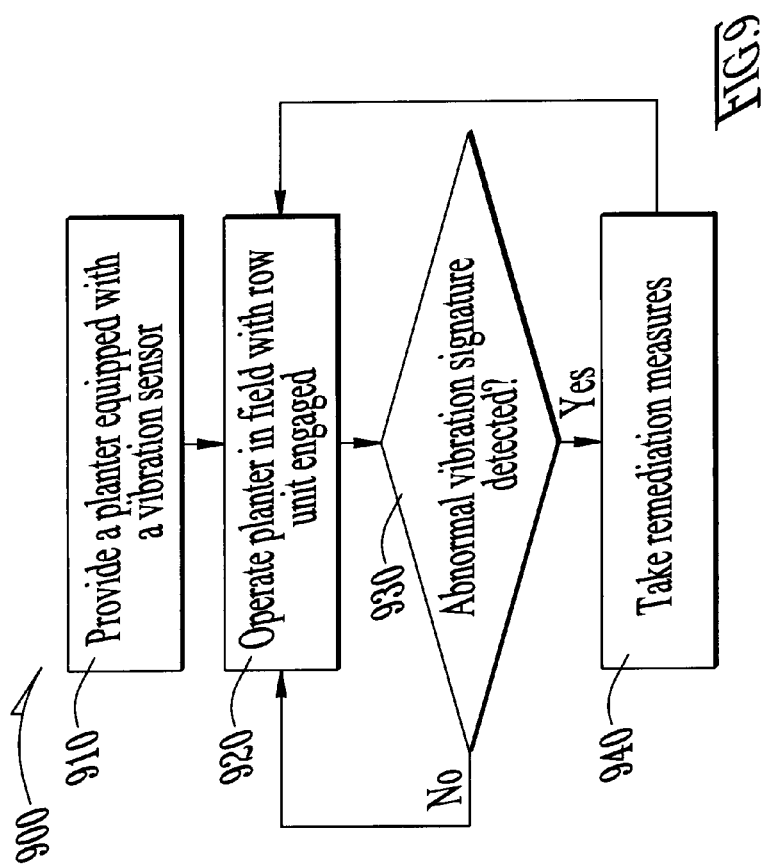

FIG. 9 illustrates a method for detecting a clogged rotating element using one or more vibration sensors in accordance with an embodiment of the invention.

Figure 10:
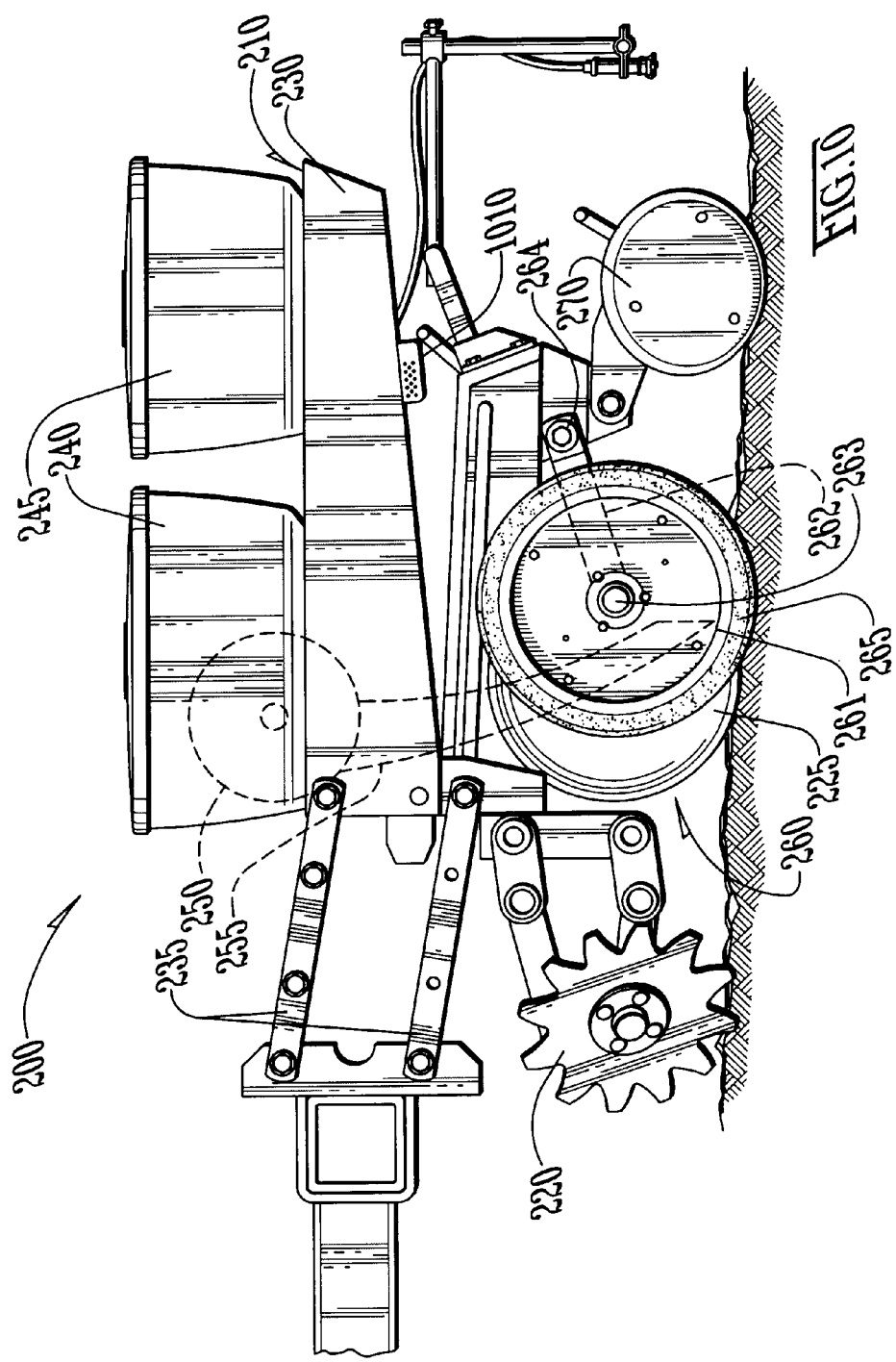

FIG. 10 illustrates an apparatus for detecting a clogged rotating element using one or more microphones in accordance with an embodiment of the invention.

Figure 11:
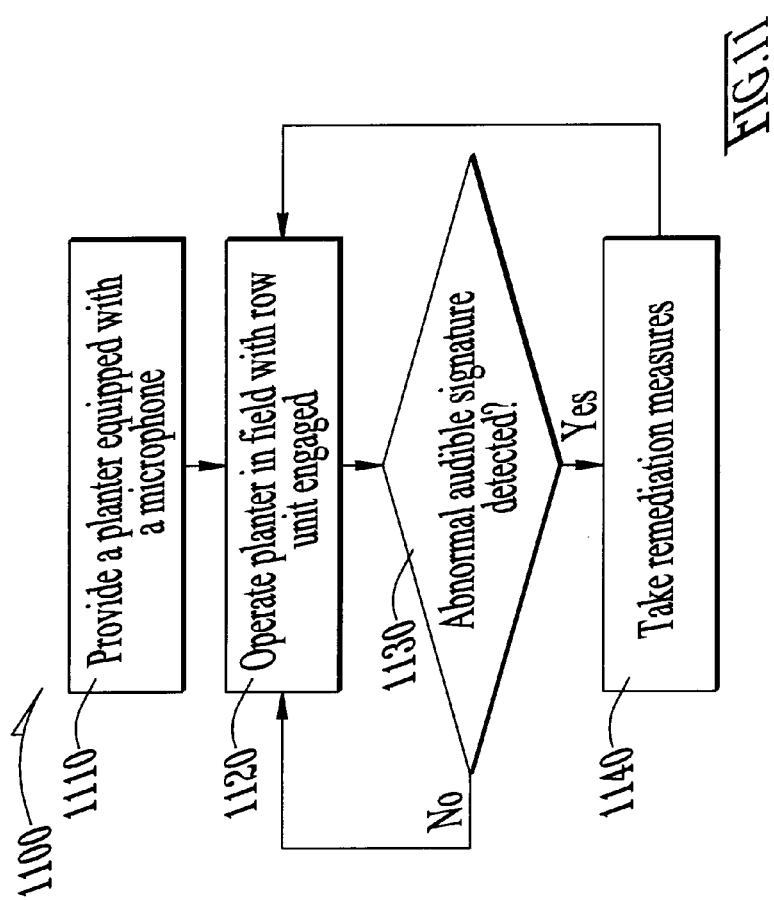

FIG. 11 illustrates a method for detecting a clogged rotating element using one or more microphones in accordance with an embodiment of the invention.

Figure 12:
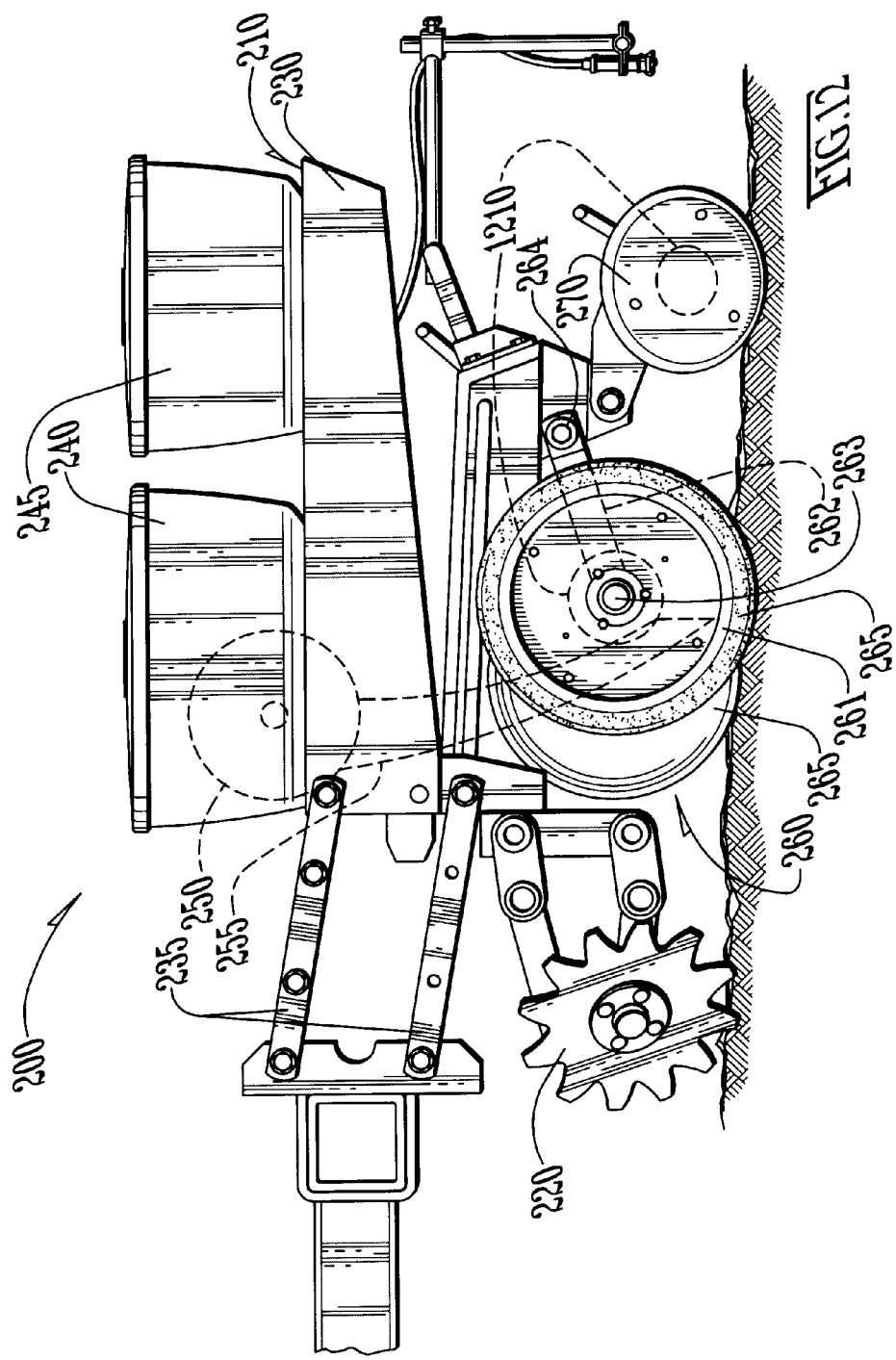

FIG. 12 illustrates an apparatus for clearing a clogged rotating element using a motor in accordance with an embodiment of the invention.

Figure 13:
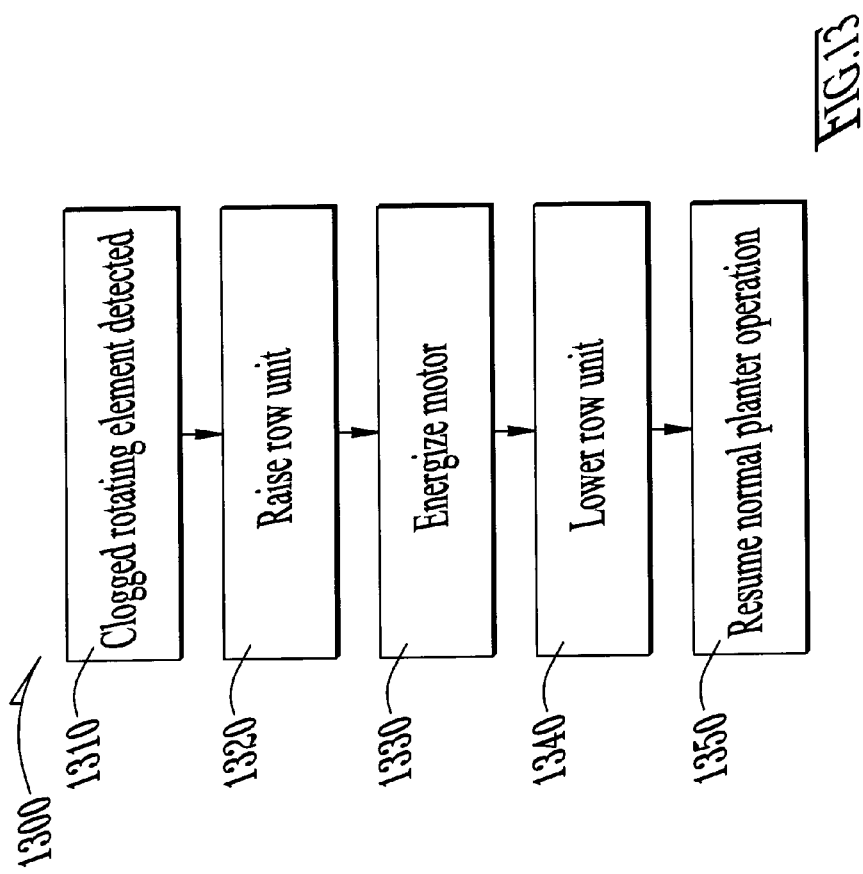

FIG. 13 illustrates a method for clearing a clogged rotating element using a motor in accordance with an embodiment of the invention.

Figure 14:
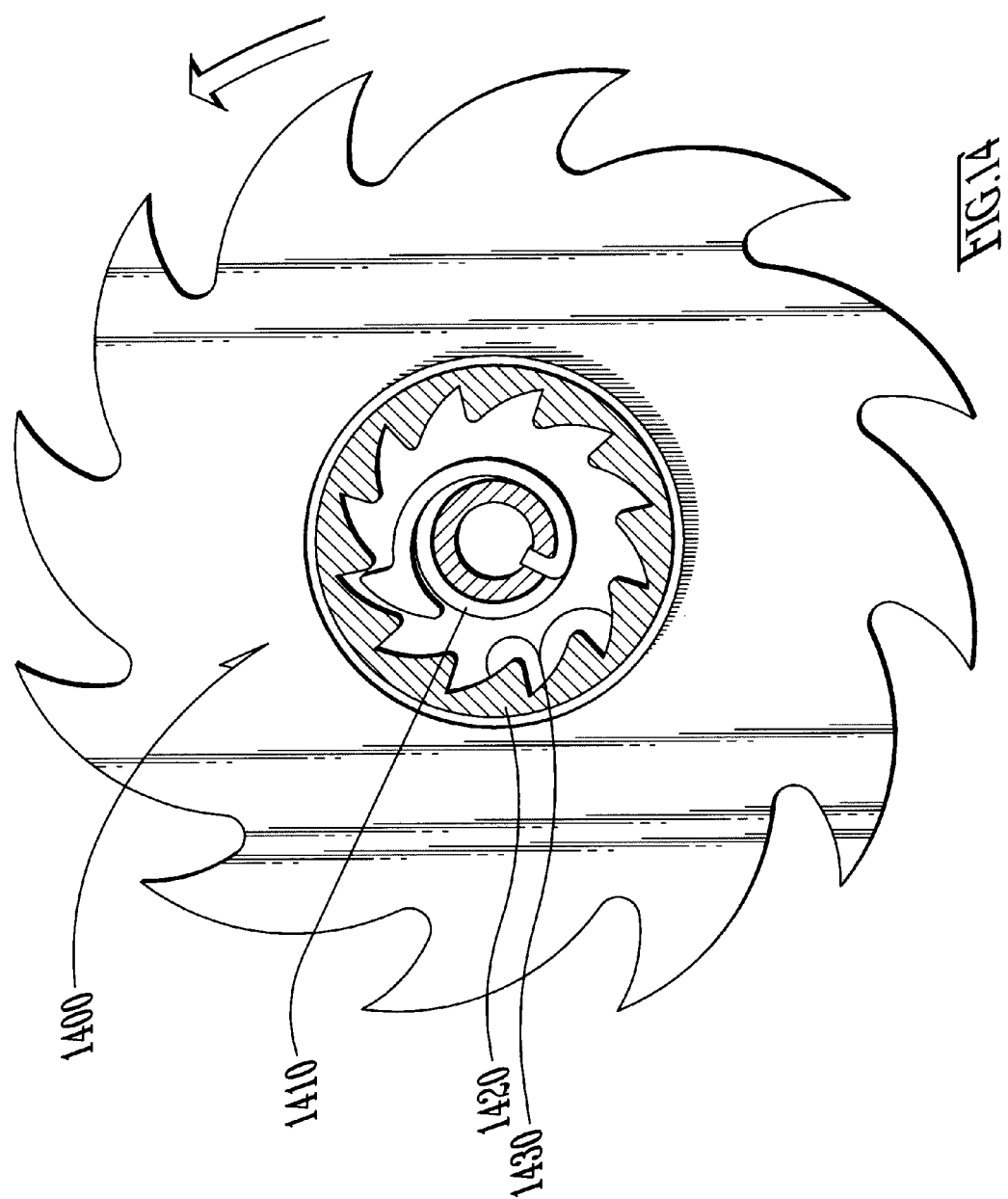

FIG. 14 illustrates an apparatus for clearing a clogged rotating element using a spring mechanism in accordance with an embodiment of the invention.

Figure 15:
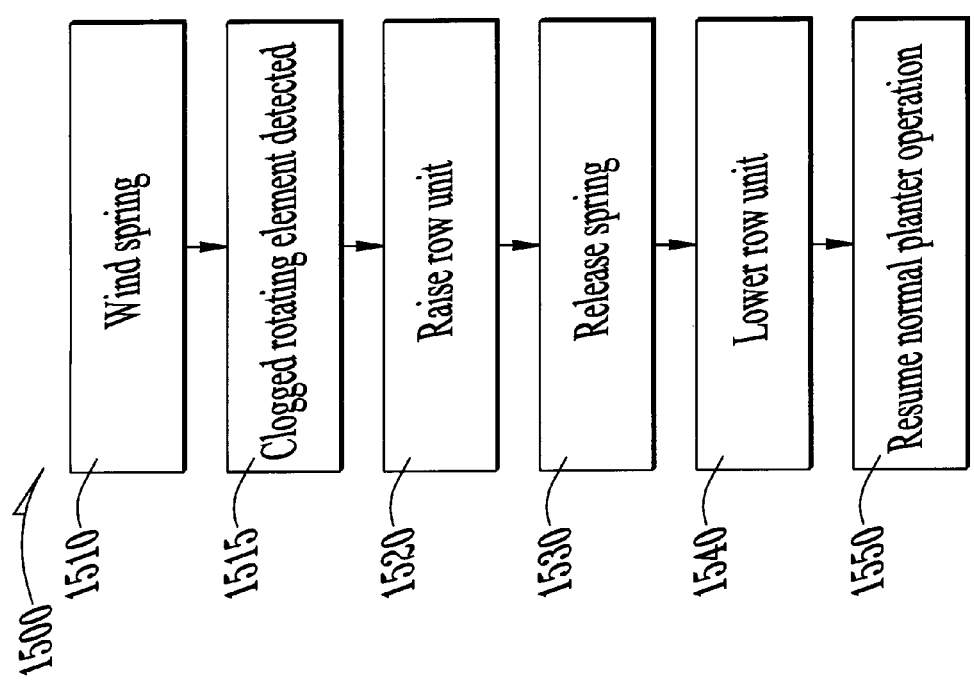

FIG. 15 illustrates a method for clearing a clogged rotating element using a spring mechanism in accordance with an embodiment of the invention.

Figure 16:
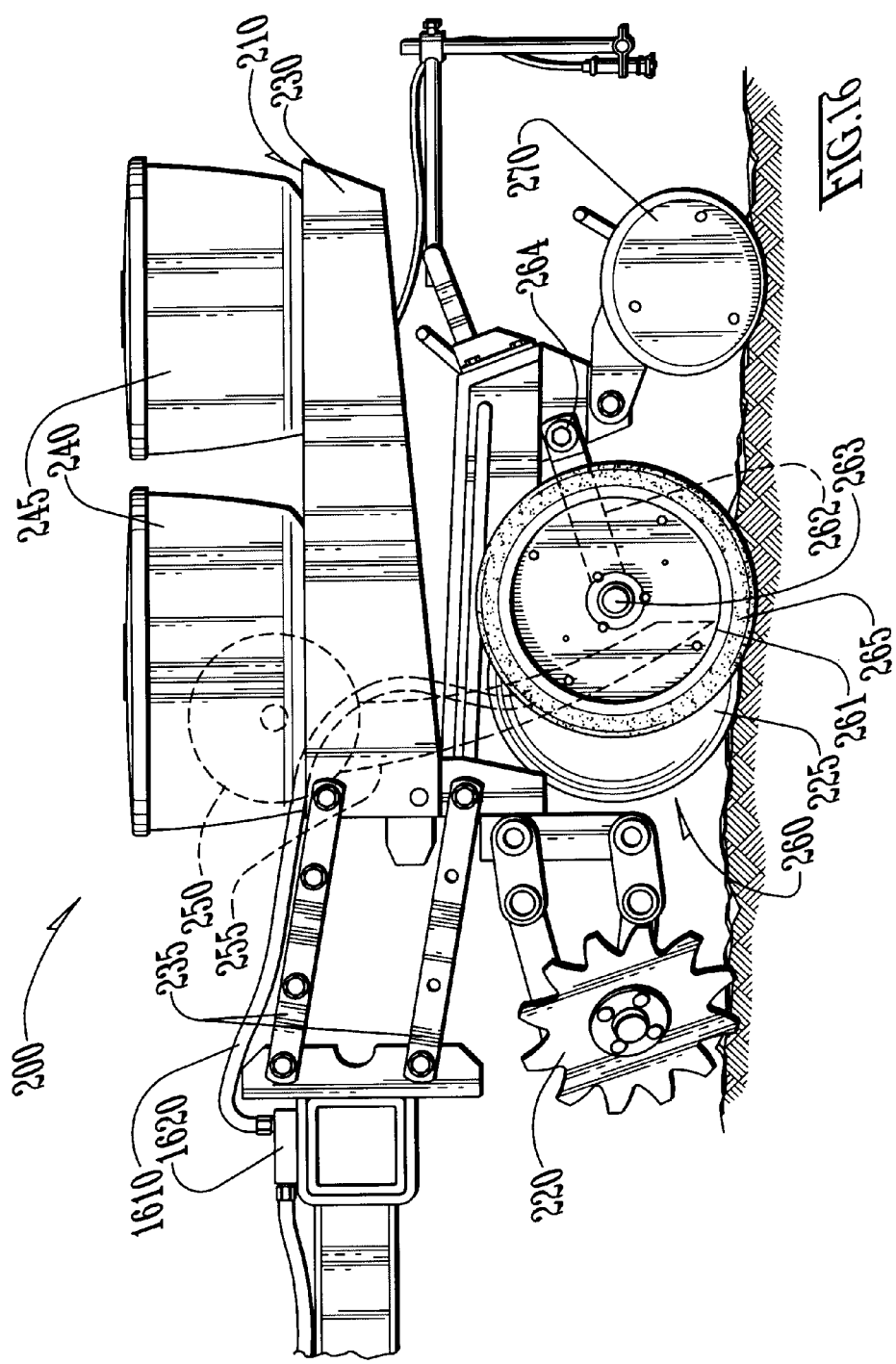

FIG. 16 illustrates an apparatus for clearing a clogged seed tube in accordance with an embodiment of the invention.

Figure 17:
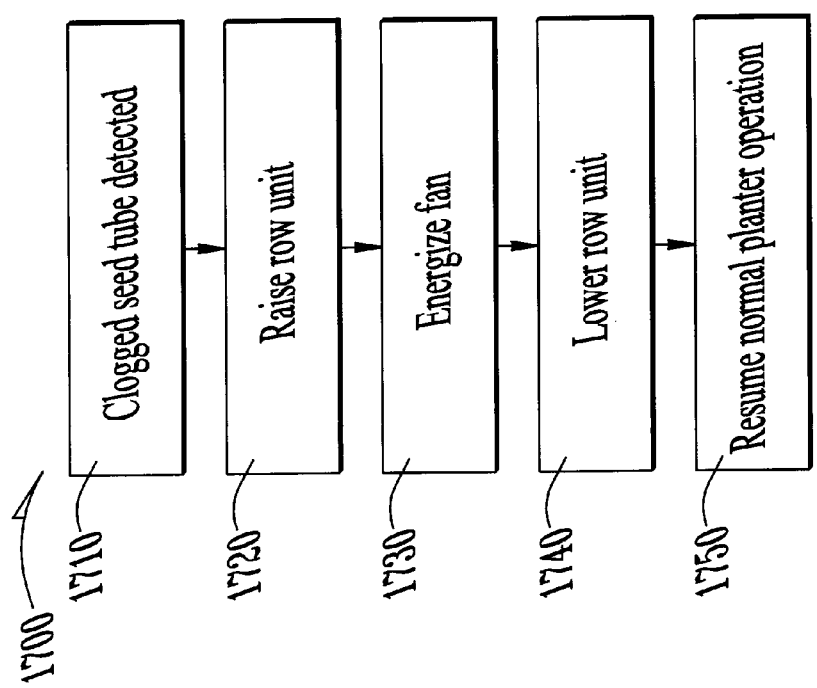

FIG. 17 illustrates a method for clearing a clogged seed tube in accordance with an embodiment of the invention.

DETAILED DESCRIPTION

Some embodiments of the present invention will now be described more fully hereinafter with reference to the accompanying drawings, in which some, but not all, embodiments of the invention are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the apparatus are not shown in one or more of the figures for clarity and to facilitate explanation of embodiments of the present invention.

In accordance with one embodiment, FIG. 1 illustrates a typical arrangement 1 of a tractor 10 and a planter 20 used for planting seeds in an agricultural field. Tractor 10 may be a manned or autonomous vehicle capable of towing and powering implements.

Planter 20 is coupled to tractor 10 using either a drawbar or three-point hitch. Planter 20 may be any commercially available planter with any number of row units 200 mounted to a main frame 210 at regularly spaced intervals. Each row unit 200 is vertically adjustable relative to the main frame 210.

A monitor 30 mounted on tractor 10 communicates with various systems of tractor 10 and implement 20. For example, monitor 30 is configured to receive and transmit signals to the CAN bus, engine control unit (ECU), and other systems of tractor 10. Monitor 30 also communicates with a GPS unit 40 mounted to tractor 10. Monitor 30 may be a tablet, laptop, or commercially available display for use in agricultural vehicles. GPS unit 40 is configured to receive satellite signals indicating the precise location of the GPS unit 40 and tractor 10. Software running on monitor 30 is configured to control many aspects of the arrangement 1. For example, using location information from the GPS unit 40, software running on monitor 30 can control the movement of tractor 10, raising and lowering of the planter 20, and seed rates applied by the planter 20. Software running on monitor 30 is also configured to record data regarding the operation of the tractor 10 and planter 20, including the path driven by tractor 10, seed rates applied by the planter 20 throughout each planted field, and data generated by various sensors mounted to the tractor 10 or planter 20.

A microprocessor 35 mounted on planter 20 is electronically connected to any sensors mounted on the planter 20. Microprocessor 35 is configured to receive signals from any attached sensors and perform processing to determine if sensor readings are within acceptable ranges. Microprocessor 35 is also configured to receive and transmit signals to the monitor 30. If microprocessor 35 detects an abnormal sensor reading, then that information is transmitted to monitor 30, and the tractor 10 or planter 20 can be stopped or other remediation measures can be taken. Throughout this disclosure, any processing of sensor signals may be performed on either monitor 30 or microprocessor 35. In a typical planter, simple processing tasks are performed by microprocessor 35, and readings and results captured by microprocessor 35 are communicated to monitor 30 for further processor or other action.

As shown in FIGS. 2, 4, 6, 8, 10, 12, and 16, each row unit 200 comprises a row unit frame 230 that is independently vertically adjustable relative to the main frame 210 by a pair of fore and aft links 235. Each row unit 200 may include a seed hopper 240 and a fertilizer hopper 245. Each row unit includes a seed selection mechanism or seed meter 250 that receives seed from the seed hopper 240 and discharges it downwardly through a seed tube 255, placing seed in the soil at regularly spaced intervals. A trash wheel or row cleaner 220 is mounted on the row unit frame 230 forwardly of a furrow opening device or disc opener 225. The disc opener 225 generally comprises a pair of generally vertical disks. In operation, the lower portion of the disc opener 225 is disposed below ground level such that the disks form a V-shaped groove or furrow in the soil as the planter 20 advances. The seed tube 255 deposits the seed in the furrow formed by the disc opener 225.

A gauge wheel assembly 260 is mounted on the row unit frame 230 adjacent to the disc opener 225. Gauge wheel assembly 260 generally comprises a pair of gauge wheels 261 respectively disposed adjacent the outer sides of the furrow opening disks of disc opener 225. The gauge wheels 261 are respectively mounted at the lower ends of arms 262 via shafts 263 that rotatably support the respective gauge wheels 261. The upper ends of the arms 262 are connected to the row unit frame 230 by means of an upper arm mounting structure 264. The gauge wheels 261 may be provided with rubber tires 265 around their periphery, and the tires present a relatively flat ground engaging surface. Since the gauge wheels 261 ride on the surface of the ground when the planter 20 is in operation, the vertical position of the gauge wheels 261 relative to the disc opener 225 controls the depth of the furrow that is opened by the disc opener 225. A furrow closing wheel 270 is mounted on the row unit frame 230 immediately behind the gauge wheel assembly 260. The furrow closing wheel 270 is configured to cover seeds that have been placed in the furrow with soil.

While one embodiment of a planter 20 and row unit 200 are shown in the figures, many types of planters exist. The apparatus and methods described are not limited to the type of planter 20 illustrated, and may be applied to any type of planter 20 or row unit 200. Throughout the disclosure, the systems and methods described may be applied to any of a trash wheel 220, disc opener 225, gauge wheel 261, and closing wheel 270, and these elements are referred to as a rotating element 220/225/261/270 unless specifically called out.

Clog Detection and Remediation Using a Hall Effect Sensor

As shown in FIG. 2, an apparatus for detecting a clogged rotating element 220/225/261/270 comprises a hall effect sensor 280 mounted on the row unit 200 adjacent to the rotating element 220/225/261/270 of a planter 20. The hall effect sensor 280 may be fixedly attached to the row unit frame 230, or may be mounted to another rigid and stationary structure on the row unit 200 adjacent to the rotating element 220/225/261/270. The hall effect sensor 280 is configured to take continuous readings indicative of the state of the adjacent rotating element 220/225/261/270. Because the metal disks of a rotating element 220/225/261/270 may be toothed or notched around their circumferences, the hall effect sensor 280 will read a pulsed signal during normal operation in which the rotating element 220/225/261/270 is not clogged and is turning freely. A constant, non-pulsing signal read by the hall effect sensor 280 is indicative of a rotating element 220/225/261/270 that is not turning and clogged. Hall effect sensor 280 is electronically connected to microprocessor 35 or monitor 30 such that readings taken by the hall effect sensor 280 can be communicated to microprocessor 35 or monitor 30, and software running on microprocessor 35 or monitor 30 can determine if the rotating element 220/225/261/270 is turning. Microprocessor 35 or monitor 30 reads the pulses sensed by hall effect sensor 280 and computes the RPM experienced by the rotating element 220/225/261/270. If the RPM is nearly zero under normal field conditions, then a clogged rotating element 220/225/261/270 is indicated.

As shown in FIG. 3, a method 300 for detecting a clogged rotating element 220/225/261/270 using a hall effect sensor 280 begins at step 310 with providing a planter 20 equipped with a hall effect sensor 280 as previously described.

At step 320, the planter 20 is operated normally through the field. During normal operation, each row unit 200 of planter 20 is lowered such that the trash wheel 220, disc opener 225, gauge wheels 261, and furrow closing wheel 270 of each row unit 200 are engaging the soil and seeds are being planted in the furrow through the seed tube 255. Hall effect sensor 280 continuously measures the magnitude of the magnetic field created by the adjacent rotating element 220/225/261/270 and communicates the measurements to the microprocessor 35 or monitor 30.

At step 330, software running on microprocessor 35 or monitor 30 determines if the signal being read by the hall effect sensor 280 is pulsed or constant. Microprocessor 35 or monitor 30 reads the pulses generated by hall effect sensor 280 and computes the RPM experienced by the rotating element. If the signal is pulsed as indicated by a non-zero RPM, then the rotating element 220/225/261/270 adjacent to the hall effect sensor 280 is operating normally, and normal operation of the planter 20 continues in accordance with step 320. If the signal is not pulsed or is constant as indicated by an RPM of approximately zero, then the rotating element 220/225/261/270 adjacent to the hall effect sensor 280 is not turning, and the method proceeds to step 340.

At step 340, clog remediation measures are taken. Once the clog has been remedied, the method proceeds to step 320 and normal operation of planter 20.

Clog Detection and Remediation Using an Infrared Sensor

As shown in FIG. 4, an apparatus for detecting a clogged rotating element 220/225/261/270 comprises an infrared sensor 410 mounted on the row unit 200 adjacent to and slightly ahead of the rotating element 220/225/261/270 of a planter 20. The infrared sensor 410 may be fixedly attached to the row unit frame 230 or may be mounted to another rigid and stationary structure on the row unit 200 adjacent to rotating element 220/225/261/270. In a typical clog, a mass of soil and other debris accumulates in front of a rotating element 220/225/261/270. To detect such a clog, the infrared sensor 410 is mounted such that its field of view covers the area directly in front of the gauge wheel 261 or closing wheel 270. The infrared sensor 410 is configured to take continuous readings indicative of the temperature or surface characteristics of the area ahead of the adjacent gauge wheel 261 or closing wheel 270. When a mass of debris with a temperature differing from the soil temperature collects in the field of view of the infrared sensor 410, the output voltage of infrared sensor 410 changes, indicating that the rotating element 220/225/261/270 being monitored is clogged. Similarly, when an object of similar temperature but different surface characteristics collects in the field of view of the infrared sensor 410, the output voltage of infrared sensor 410 changes, indicating that the rotating element 220/225/261/270 being monitored is clogged. Infrared sensor 410 is electronically connected to microprocessor 35 or monitor 30 such that readings taken by the infrared sensor 410 can be communicated to microprocessor 35 or monitor 30, and software running on microprocessor 35 or monitor 30 can determine if the gauge wheel 261 or closing wheel 270 is clogged.

As shown in FIG. 5, a method 500 for detecting a clogged gauge wheel 261 or closing wheel 270 using an infrared sensor 410 begins at step 510 with providing a planter 20 equipped with an infrared sensor 410 as previously described.

At step 520, the planter 20 is operated normally through the field. During normal operation, each row unit 200 of planter 20 is lowered such that the trash wheel 220, disc opener 225, gauge wheels 261, and furrow closing wheel 270 of each row unit 200 are engaging the soil and seeds are being planted in the furrow through the seed tube 255. Infrared sensor 410 continuously measures the amount of infrared light radiating from the area ahead of the adjacent gauge wheel 261 or furrow closing wheel 270 and communicates the measurements to the microprocessor 35 or monitor 30.

At step 530, software running on microprocessor 35 or monitor 30 determines if the output voltage of the infrared sensor 410 has changed. If the output voltage reading from the infrared sensor 410 remains relatively constant within a normal operating range, then the rotating element 220/225/ 261/270 adjacent to the infrared sensor 410 is operating normally, and normal operation of the planter 20 continues in accordance with step 520. If the output voltage reading from the infrared sensor 410 changes such that the output voltage is no longer within a normal range of values, then a mass has accumulated ahead of the rotating element 220/ 225/261/270 adjacent to the infrared sensor 410, and the method proceeds to step 540.

At step 540, clog remediation measures are taken. Once the clog has been remedied, the method proceeds to step 520 and normal operation of planter 20.

Clog Detection and Remediation Using a Camera and Image Processing Techniques

As shown in FIG. 6, an apparatus for detecting a clogged rotating element 220/225/261/270 comprises one or more cameras 610 mounted on the row unit 200 adjacent to a rotating element 220/225/261/270 of a planter 20. The camera 610 may be fixedly attached to the row unit frame 230 or may be mounted to another rigid and stationary structure on the row unit 200 adjacent to rotating element 220/225/261/270. The camera 610 may be forward-looking, capturing images of the area ahead of the rotating element 220/225/261/270. In another embodiment, the camera 610 may downward-looking, capturing images of the rotating element 220/225/261/270. When a downward-looking camera 610 is used, a fiducial 620 is attached to the rotating element 220/225/261/270. As the rotating element 220/225/ 261/270 rotates, fiducial 620 moves, providing a reference point in the images captured by camera 610 to indicate if the rotating element 220/225/261/270 is moving. In another embodiment, the camera 610 may be backward-looking, capturing images of the area behind the row unit 200. Any combination of forward-looking, downward-looking, or backward-looking cameras 610 may be used.

The camera 610 is configured to continuously capture images in its field of view. Camera 610 is electronically connected to monitor 30 or microprocessor 35 such that images captured by the camera 610 can be communicated to monitor 30 or microprocessor 35, and software running on monitor 30 or microprocessor 35 can use image processing techniques to determine if the rotating element 220/225/261/ 270 is clogged.

As shown in FIG. 7, a method 700 for detecting a clogged rotating element 220/225/261/270 using a camera 610 begins at step 710 with providing a planter 20 equipped with one or more cameras 610 as previously described.

At step 720, the planter 20 is operated normally through the field. During normal operation, each row unit 200 of planter 20 is lowered such that the trash wheel 220, disc opener 225, gauge wheels 261, and furrow closing wheel 270 of each row unit 200 are engaging the soil and seeds are being planted in the furrow through the seed tube 255. Camera 610 continuously captures images in its field of view and communicates the images to the microprocessor 35 or monitor 30.

At step 730, software running on microprocessor 35 or monitor 30 performs image processing techniques on the images captured by camera 610. In the case of a downward-looking camera 610, the location of the fiducial 620 is determined for each captured image and compared to the location of the fiducial in the previously captured image. If the location of the fiducial 620 changes from image to image, then the rotating element 220/225/261/270 adjacent to the camera 610 is operating normally, and normal operation of the planter 20 continues in accordance with step 720. If the location of the fiducial 620 remains relatively constant, then the rotating element 220/225/261/270 adjacent to the camera 610 is not rotating, an abnormal image is indicated, and the method proceeds to step 740. During normal operation of planter 20, some amount of plant stalks and other debris can be seen lying on the soil behind the row unit 200. However, when a rotating element 220/225/261/270 is clogged, a patch of bare soil is left behind the row unit 200. In the case of a backward-looking camera 610, software running on the microprocessor 35 or monitor 30 applies image processing algorithms to the images captured by the camera 610 to determine if a patch of bare soil is being left behind the row unit 200. In one embodiment, the color values of the pixels in the image captured by the camera 610 are averaged. If the average color value is above a threshold, then a normal amount of ground debris is indicated in the image, the rotating element 220/225/261/270 adjacent to the camera 610 is operating normally, and normal operation of the planter 20 continues in accordance with step 720. If the average color value is below a threshold, then an abnormally low amount of ground debris is indicated in the image, the rotating element 220/225/261/270 adjacent to the camera 610 is not rotating, and the method proceeds to step 740. Other well-known image processing techniques may be applied to the images to determine if a normal amount of ground debris is present.

At step 740, clog remediation measures are taken. Once the clog has been remedied, the method proceeds to step 720 and normal operation of planter 20.

Clog Detection and Remediation Using a Vibration Sensor

As shown in FIG. 8, an apparatus for detecting a clogged rotating element 220/225/261/270 comprises a vibration sensor 810 mounted on each row unit 200 of planter 20. The vibration sensor 810 may be fixedly attached to the row unit frame 230 or may be mounted to another part of the row unit 200. The vibration sensor 810 is configured to take continuous readings of the vibration level of the row unit 200. When a mass of debris accumulates on a rotating element 220/ 225/261/270, a differing vibration signal is produced. The rotating element 220/225/261/270 may be modified to purposely create a unique vibration signature during normal operation such that detection of an abnormal vibration signature is easier. For example, a rotating element 220/225/ 261/270 may be modified by forcing the rotating element 220/225/261/270 to be imbalanced by adding or removing weight at a point on the rotating element 220/225/261/270. As another example, an external component may be attached to rotating element 220/225/261/270 to force vibration. Vibration sensor 810 is electronically connected to microprocessor 35 or monitor 30 such that readings taken by the vibration sensor 810 can be communicated to microprocessor 35 or monitor 30, and software running on microprocessor 35 or monitor 30 can determine if the rotating element 220/225/261/270 is clogged.

As shown in FIG. 9, a method 900 for detecting a clogged rotating element 220/225/261/270 using a vibration sensor 810 begins at step 910 with providing a planter 20 equipped with a vibration sensor 810 as previously described.

At step 920, the planter 20 is operated normally through the field. During normal operation, each row unit 200 of planter 20 is lowered such that the trash wheel 220, disc opener 225, gauge wheels 261, and furrow closing wheel 270 of each row unit 200 are engaging the soil and seeds are being planted in the furrow through the seed tube 255. Vibration sensor 810 continuously measures the vibration level being experienced by the row unit 200 and communicates the measurements to the microprocessor 35 or monitor 30.

At step 930, software running on microprocessor 35 or monitor 30 compares the current vibration level being measured by vibration sensor 810 to the normal vibration signature of the row unit 200. If the vibration level being measured by the vibration sensor 810 matches the normal vibration signature, then the row unit 200 is operating normally, the rotating element 220/225/261/270 is not clogged, and normal operation of the planter 20 continues in accordance with step 920. If the current vibration level being measured by vibration sensor 810 differs from the normal vibration signature by a defined threshold, then a clogged condition of the rotating element 220/225/261/270 is indicated, and the method proceeds to step 940.

At step 940, clog remediation measures are taken. Once the clog has been remedied, the method proceeds to step 920 and normal operation of planter 20.

Clog Detection and Remediation Using a Microphone

As shown in FIG. 10, an apparatus for detecting a clogged rotating element 220/225/261/270 comprises a microphone 1010 mounted on each row unit 200 of planter 20. The microphone 1010 may be fixedly attached to the row unit frame 230 or may be mounted to another part of the row unit 200. The microphone 1010 is configured record sounds being produced by the row unit 200. When a mass of debris accumulates on the rotating element 220/225/261/270, a differing audible signature is produced. The rotating element 220/225/261/270 may be modified to purposely create a unique audible signature during normal operation such that detection of an abnormal audible signature is easier. For example, a dog gear may be mounted on the axle of a rotating element 220/225/261/270 to create a unique audible signature, or another object may be attached to a rotating element 220/225/261/270 to create a unique audible signature. Microphone 1010 is electronically connected to microprocessor 35 or monitor 30 such that sounds recorded by the microphone 1010 can be communicated to microprocessor 35 or monitor 30, and software running on microprocessor 35 or monitor 30 can determine if the rotating element 220/225/261/270 is clogged.

As shown in FIG. 11, a method 1100 for detecting a clogged rotating element 220/225/261/270 using a microphone 1010 begins at step 1110 with providing a planter 20 equipped with a microphone 1010 as previously described.

At step 1120, the planter 20 is operated normally through the field. During normal operation, each row unit 200 of planter 20 is lowered such that the trash wheel 220, disc opener 225, gauge wheels 261, and furrow closing wheel 270 of each row unit 200 are engaging the soil and seeds are being planted in the furrow through the seed tube 255. Microphone 1010 continuously records sounds being produced by the row unit 200 and communicates the recorded audio to the microprocessor 35 or monitor 30.

At step 1130, software running on microprocessor 35 or monitor 30 compares the current audible signature being captured by microphone 1010 to the normal audible signature of the row unit 200. If the audible signature being captured by the microphone 1010 matches the normal audible signature, then the row unit 200 is operating normally, the rotating elements 220/225/261/270 are not clogged, and normal operation of the planter 20 continues in accordance with step 1120. If the current audible signature being captured by microphone 1010 differs from the normal audible signature by a defined threshold, then a clogged condition of a rotating element 220/225/261/270 is indicated, and the method proceeds to step 1140.

At step 1140, clog remediation measures are taken. Once the clog has been remedied, the method proceeds to step 1120 and normal operation of planter 20.

Clog Remediation Using a Motor

As shown in FIG. 12, an apparatus for remediating a clogged rotating element 220/225/261/270 comprises one or more motors 1210 mounted on rotating element 220/225/261/270 of each row unit 200 of planter 20. A motor 1210 may be mounted on the rotating element 220/225/261/270 such that the rotor of the motor 1210 is coupled to the center of the rotating element 220/225/261/270, and the motor 1210 is configured to rotate the rotating element 220/225/261/270 when energized. Motor 1210 is appropriately sized to be capable of rotating a clogged rotating element 220/225/261/270. Motor 1210 is electronically connected to microprocessor 35 or monitor 30 such that motor 1210 can be controlled by software running on microprocessor 35 or monitor 30.

As shown in FIG. 13, a method 1300 for remediating a clogged rotating element 220/225/261/270 using a motor 1210 begins at step 1310 with detecting a clogged rotating element 220/225/261/270. Tractor 10 and planter 20 may be stopped at this time or may continue moving while method 1300 proceeds.

At step 1320, the row unit 200 is lifted.

At step 1330, motor 1210 is energized such that its rotor rotates, and the rotating element 220/225/261/270 coupled to the rotor also rotates. Through rotation of the rotating element 220/225/261/270, any soil or debris that has accumulated is forced through the rotating element 220/225/261/270, and the accumulated soil and debris is thus removed.

At step 1340, the row unit 200 is lowered.

At step 1350, normal operation of the planter 20 resumes. During normal operation, each row unit 200 of planter 20 is lowered such that the trash wheel 220, disc opener 225, gauge wheels 261, and furrow closing wheel 270 of each row unit 200 are engaging the soil and seeds are being planted in the furrow through the seed tube 255. If it is determined that the clog was not fully remediated, steps 1310 through 1350 may be repeated until the clog has been completely cleared.

Clog Remediation Using a Spring Mechanism

As shown in FIG. 14, an apparatus for remediating a clogged rotating element 220/225/261/270 comprises one or more spring mechanisms 1400 mounted on rotating element 220/225/261/270 of each row unit 200 of planter 20. A spring mechanism 1400 comprises a clutch plate 1420 that is coupled to the frame 230 of planter 20. Clutch plate 1420 does not rotate. Spring 1410 is coupled to rotating element 220/225/261/270, and rotates around the same axis as rotating element 220/225/261/270. Rotation of rotating element 220/225/261/270 causes spring 1410 to rotate, as well.

Spring 1410 is appropriately sized to be capable of rotating a clogged rotating element 220/225/261/270 when released. Spring 1410 is wound up as it rotates, and engagement of the teeth of spring 1410 on one or more notches 1430 on clutch plate 1420 prevents spring 1410 from unwinding.

As shown in FIG. 15, a method 1500 for remediating a clogged rotating element 220/225/261/270 using a spring mechanism 1400 begins at step 1510 with in which the spring 1410 of the spring mechanism 1400 is wound up as planter 20 advances through the field and rotating element 220/225/261/270 rotates in its forward direction of travel.

At step 1515, a clogged rotating element 220/225/261/270 is detected.

At step 1520, the row unit 200 is lifted. Tractor 10 and planter 20 may be stopped at this time, or may continue moving while method 1500 proceeds.

At step 1530, lifting of the row unit 200 allows spring 1410 to be released such that the rotating element 220/225/261/270 coupled to the spring 1410 rotates in a direction opposite to its forward direction of travel. Through rotation of the rotating element 220/225/261/270, any soil or debris that has accumulated is forced through the rotating element 220/225/261/270, and the accumulated soil and debris is thus removed.

At step 1540, the row unit 200 is lowered.

At step 1550, normal operation of the planter 20 resumes. During normal operation, each row unit 200 of planter 20 is lowered such that the trash wheel 220, disc opener 225, gauge wheels 261, and furrow closing wheel 270 of each row unit 200 are engaging the soil and seeds are being planted in the furrow through the seed tube 255. If it is determined that the clog was not fully remediated, steps 1510 through 1550 may be repeated until the clog has been completely cleared.

Seed Tube Clog Remediation

As shown in FIG. 16, an apparatus for remediating a clogged seed tube 255 comprises an air hose 1610 wherein a first end of the air hose 1610 is connected to a first end of a valve 1620 and a second end of air hose 1610 is connected to the upper end of seed tube 255. A second end of the valve 1620 connects to an air compressor on planter 20 via additional air hose Valve 1620 is electronically connected to microprocessor 35 or monitor 30 such that valve 1620 can be controlled by software running on microprocessor 35 or monitor 30.

As shown in FIG. 17, a method 1700 for remediating a clogged seed tube 255 begins at step 1710 with detecting a clogged seed tube 255. Tractor 10 and planter 20 may be stopped at this time or may continue moving while method 1700 proceeds.

At step 1720, the row unit 200 is lifted.

At step 1730, valve 1620 is opened such that air is routed to air hose 1610. Air travels through air hose 1610 and into seed tube 255, forcing out any soil or debris that has accumulated in seed tube 255. In another embodiment, soil or other debris may be removed from the seed tube 255 by vibrating the seed tube 255 or row unit 200. In another embodiment, a chain or other elongated structure may be inserted into seed tube 255, thus clearing any accumulated soil or debris.

At step 1740, the row unit 200 is lowered.

At step 1750, normal operation of the planter 20 resumes. During normal operation, each row unit 200 of planter 20 is lowered such that the trash wheel 220, disc opener 225, gauge wheels 261, and furrow closing wheel 270 of each row unit 200 are engaging the soil and seeds are being planted in the furrow through the seed tube 255. If it is determined that the clog was not fully remediated, steps 1710 through 1750 may be repeated until the clog has been completely cleared.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for detecting a clogged rotating element of an agricultural planter comprising:
    providing an agricultural planter equipped with one or more cameras configured to capture images of one or more rotating elements of the planter, wherein each rotating element comprises a fiducial mounted in a fixed location on the rotating element;
    capturing a plurality of images of the one or more rotating elements as the planter is operated;
    identifying a location of the fiducial in each captured image;
    comparing the location of the fiducial in a current image to the location of the fiducial in one or more previously captured images; and
    taking remedial action if the location of the fiducial is the same in the current image and the previously captured image.

2. The method of claim 1 wherein the rotating element comprises a gauge wheel of the planter.

3. The method of claim 1 wherein the rotating element comprises a closing wheel of the planter.

4. The method of claim 1 wherein the rotating element comprises a disc opener of the planter.

5. The method of claim 1 wherein the rotating element comprises a trash wheel of the planter.

6. The method of claim 1 wherein the rotating element comprises a row cleaner of the planter.

7. The method of claim 1 wherein taking remedial action comprises creating an alert indicating that a rotating element of the planter is clogged.

8. The method of claim 1 wherein taking remedial action comprises stopping operation of the planter.

* * * * *